US007457701B2

(12) United States Patent
Tanaka

(10) Patent No.: US 7,457,701 B2
(45) Date of Patent: Nov. 25, 2008

(54) AIR QUANTITY ESTIMATION APPARATUS FOR INTERNAL COMBUSTION ENGINE

(75) Inventor: Satoru Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 79 days.

(21) Appl. No.: 11/628,579

(22) PCT Filed: Dec. 27, 2005

(86) PCT No.: PCT/JP2005/024233

§ 371 (c)(1),
(2), (4) Date: Dec. 6, 2006

(87) PCT Pub. No.: WO2006/075539

PCT Pub. Date: Jul. 20, 2006

(65) Prior Publication Data

US 2008/0033627 A1 Feb. 7, 2008

(30) Foreign Application Priority Data

Jan. 11, 2005 (JP) ............................ 2005-004491

(51) Int. Cl.
*F02D 41/14* (2006.01)
*G06F 19/00* (2006.01)
*G01M 15/00* (2006.01)
*G01M 12/00* (2006.01)

(52) U.S. Cl. ................ 701/103; 123/568.21; 73/114.32

(58) Field of Classification Search ................. 701/101, 701/103, 104, 105, 108, 109; 123/417, 421, 123/491, 494, 489, 647, 568.14, 568.21, 123/568.24, 568.29; 73/114.31, 114.32, 73/114.34, 204.13
See application file for complete search history.

(56) References Cited

U.S. PATENT DOCUMENTS

| | | | | |
|---|---|---|---|---|
| 6,728,626 | B2 * | 4/2004 | Maira et al. | 701/114 |
| 6,816,771 | B2 * | 11/2004 | Miura et al. | 701/102 |
| 7,069,139 | B2 * | 6/2006 | Muto et al. | 701/104 |
| 7,143,753 | B2 * | 12/2006 | Tanaka et al. | 123/568.14 |
| 7,150,264 | B2 * | 12/2006 | Kobayashi et al. | 123/376 |
| 7,200,486 | B2 * | 4/2007 | Tanaka et al. | 701/109 |
| 2002/0035868 | A1 | 3/2002 | Muto et al. | |
| 2007/0255483 | A1 * | 11/2007 | Tanaka | 701/101 |

FOREIGN PATENT DOCUMENTS

EP 1 209 449 A2 5/2002

(Continued)

*Primary Examiner*—Willis R. Wolfe, Jr.
*Assistant Examiner*—Johnny H. Hoang
(74) *Attorney, Agent, or Firm*—Oliff & Berridge, PLC

(57) ABSTRACT

This air quantity estimation apparatus inputs an output quantity Vafm of an air flowmeter 61 disposed in an intake passage upstream of a compressor 91*a* to an AFM inverse model M1 to thereby estimate the flow rate (compressor-inflow-air flow rate) mcmi of air actually flowing into the compressor, which flow rate has been compensated for detection delay. This apparatus estimates the quantity of air introduced in a cylinder (cylinder-interior air quantity) Klfwd at a future time point after the present time point on the basis of the estimated actual compressor-inflow-air flow rate mcmi employed as a flow rate of air actually flowing out of the compressor at the present time point, and first and second air models M10 and M20 which describe the behavior of air within the intake passage downstream of the compressor in accordance with physical laws.

11 Claims, 20 Drawing Sheets

FOREIGN PATENT DOCUMENTS

| | | |
|---|---|---|
| JP | A 8-61135 | 3/1996 |
| JP | A 8-312432 | 11/1996 |
| JP | A 9-126036 | 5/1997 |
| JP | A 10-27008 | 1/1998 |
| JP | A 2000-320391 | 11/2000 |
| JP | A 2001-41095 | 2/2001 |
| JP | A 2001-516421 | 9/2001 |
| JP | A 2002-97994 | 4/2002 |
| JP | A 2003-184613 | 7/2003 |
| JP | A 2003-293821 | 10/2003 |
| JP | A 2004-522055 | 7/2004 |
| JP | A 2004-257315 | 9/2004 |
| JP | A 2006-63802 | 3/2006 |
| JP | A 2006-70881 | 3/2006 |

* cited by examiner

AIR QUANTITY ESTIMATION APPARATUS FOR INTERNAL COMBUSTION ENGINE

TECHNICAL FIELD

The present invention relates to an apparatus for estimating the quantity of air having been introduced into a cylinder of an internal combustion engine.

BACKGROUND ART

Conventionally, there have been known apparatus for estimating a cylinder-interior air quantity (quantity of air having been introduced into a cylinder of an internal combustion engine) by making use of a physical model modeling the behavior of air flowing through the intake passage of the internal combustion engine.

Japanese Patent Application Laid-Open (kokai) No. 2003-184613 discloses one of such apparatus. The disclosed apparatus uses the physical model in which the cylinder-interior air quantity to be estimated is represented by equations including terms regarding a pressure and a temperature of air upstream of a throttle valve (throttle-valve upstream air) and regarding the pressure and temperature of air downstream of the throttle valve (throttle-valve downstream air). Accordingly, the cylinder-interior air quantity cannot be accurately estimated unless the pressure and temperature of throttle-valve upstream air are accurately estimated.

Incidentally, in a naturally aspirated internal combustion engine to which the above-described conventional apparatus is applied, the pressure and temperature of throttle-valve upstream air are generally equal to those of atmospheric air. Accordingly, in the conventional apparatus, a pressure and a temperature detected by an intake-air pressure sensor and an intake-air temperature sensor disposed in an intake passage upstream of a throttle valve are employed as the pressure and temperature of throttle-valve upstream air.

Meanwhile, in some cases, a turbocharger is provided on an internal combustion engine in order to increase the maximum output of the engine. The turbocharger includes a compressor disposed upstream of a throttle valve within an intake passage. In such an internal combustion engine, since air downstream of the compressor (throttle-valve upstream air) is compressed upon operation of the compressor, the pressure and temperature of the throttle-valve upstream air suddenly vary as compared with those of atmospheric air. Therefore, possibly, the cylinder-interior air quantity cannot be accurately estimated when a pressure and a temperature detected by an intake-air pressure sensor and an intake-air temperature sensor are employed as the pressure and temperature of the throttle-valve upstream air.

A conceivable solution is to construct a physical model on the basis of the conservation law regarding air within the intake passage extending from the compressor to the throttle valve (throttle-valve upstream section) and to estimate the pressure and temperature of throttle-valve upstream air by means of the constructed physical model. In general, in accordance with a physical model constructed on the basis of the conservation law regarding air within a certain space, the pressure and temperature of air within the space can be represented by an equation including terms regarding the flow rate of air flowing into the space. Accordingly, in order to accurately estimate the pressure and temperature of throttle-valve upstream air by use of the above-described physical model, the flow rate of air flowing out of the compressor (compressor-outflow-air flow rate) must be obtained accurately.

Incidentally, this compressor-outflow-air flow rate can be considered to be equal to a compressor-inflow-air flow rate which is the flow rate of air flowing into the compressor. Accordingly, the compressor-outflow-air flow rate may be obtained by detecting the compressor-inflow-air flow rate by use of a hot-wire air flowmeter, which has been conventionally disposed in the intake passage upstream of the compressor, and employing the detected compressor-inflow-air flow rate as the compressor-outflow-air flow rate.

However, the flow rate of air detected by the hot-wire air flowmeter involves a time delay in relation to the actual flow rate of air, the time delay stemming from time required for transfer of heat between air and the hot wire and time required to heat the hot wire. Such detection delay occurs not only when a hot-wire air flowmeter is used but also when the other type of air flowmeter is used. Accordingly, when the compressor-inflow-air flow rate varies within a short period of time; for example, a transition period during which the operation conditions (load, engine speed, etc.) vary, there arises a problem that the pressure and temperature of throttle-valve upstream air cannot be accurately estimated even when the detected compressor-inflow-air flow rate is employed as the compressor-outflow-air flow rate, because the compressor-inflow-air flow rate detected by means of the air flowmeter greatly differs from the actual compressor-inflow-air flow rate.

Accordingly, an object of the present invention is to provide an air quantity estimation apparatus for an internal combustion engine equipped with a turbocharger, which apparatus can accurately estimate the compressor-inflow-air flow rate by use of an air flowmeter inverse model which compensates for the detection delay of an air flowmeter, to thereby accurately estimate the cylinder-interior air quantity.

SUMMARY OF THE INVENTION

An air quantity estimation apparatus for an internal combustion engine according to the present apparatus is applied to an internal combustion engine having an intake passage for introducing outside air into a cylinder and a turbocharger including a compressor disposed in the intake passage and compressing air within the intake passage. The air quantity estimation apparatus estimates a cylinder-interior air quantity which is a quantity of air having been introduced into the cylinder.

The air quantity estimation apparatus includes an air flowmeter, compressor-inflow-air-flow-rate estimation means and cylinder-interior-air-quantity estimation means.

The air flowmeter is disposed in the intake passage upstream of the compressor. The air flowmeter converts a flow rate of air passing through the intake passage, the flow rate being an input quantity, to an electrical physical quantity being an output quantity, and outputs the electrical physical quantity.

The compressor-inflow-air-flow-rate estimation means includes an inverse model which is a model inverse to a forward model of the air flowmeter, the forward model describing the relation between the input quantity and the output quantity of the air flowmeter, and is configured such that when an output quantity of the forward model is supplied to the inverse model as an input quantity, the inverse model outputs a corresponding input quantity of the forward model as an output quantity. The compressor-inflow-air-flow-rate estimation means obtains the output quantity of the inverse model as a compressor-inflow-air flow rate which is a flow rate of air actually flowing into the compressor at a present time point by supplying the electrical physical quantity actually output from the air flowmeter to the inverse model as the input quantity of the inverse model.

The cylinder-interior-air-quantity estimation means includes an air model which describes, in accordance with physical laws, behavior of air within the intake passage downstream of the compressor by use of a compressor-outflow-air flow rate which is a flow rate of air flowing out of the compressor into the intake passage. The cylinder-interior-air-quantity estimation means estimates the cylinder-interior air quantity by applying the obtained compressor-inflow-air flow rate at the present time point as the compressor-outflow-air flow rate at the present time point to the air model.

By virtue of this configuration, a detection delay of the air flowmeter in relation to the compressor-inflow-air flow rate which is a flow rate of air actually flowing into the compressor is compensated for. Therefore the compressor-inflow-air flow rate at the present time point can be accurately estimated. Further, the estimated compressor-inflow-air flow rate at the present time point as the compressor-outflow-air flow rate which is a flow rate of air flowing out of the compressor at the present time point, is applied to the air model, whereby the cylinder-interior air quantity is estimated. As a result, the cylinder-interior air quantity can estimated accurately.

In this case, preferably, the air model of the cylinder-interior-air-quantity estimation means describes the behavior of air by use of compressor applied energy which is applied to air passing through the compressor by the compressor, the compressor applied energy varying in accordance with a rotational speed of the compressor, and the cylinder-interior-air-quantity estimation means includes:

compressor-operation-condition-relation storage means for previously storing a compressor operation condition relation which is a relation between the compressor-outflow-air flow rate and the rotational speed of the compressor;

compressor-rotational-speed obtaining means for obtaining the rotational speed of the compressor at the present time point on the basis of the stored compressor operation condition relation and the compressor-outflow-air flow rate at the present time point applied to the air model; and compressor-applied-energy estimation means for estimating the compressor applied energy at the present time point on the basis of the obtained rotational speed of the compressor at the present time point, wherein the cylinder-interior-air-quantity estimation means estimates the cylinder-interior air quantity by applying the estimated compressor applied energy at the present time point to the air model.

The above-mentioned air model is a model which describes the behavior of air within the intake passage downstream of the compressor in accordance with physical laws such as the law of conservation of energy and the law of conservation of mass. Incidentally, the compressor applies energy (compressor applied energy) to air which passes through the compressor and flows into the intake passage downstream of the compressor. This compressor applied energy is taken into consideration in the air model. Accordingly, the cylinder-interior air quantity cannot be accurately estimated unless the compressor applied energy is accurately estimated.

The compressor-outflow-air flow rate and the compressor rotational speed (the rotational speed of the compressor) have a very strong correlation therebetween. Further, the compressor rotational speed and the compressor applied energy have a very strong correlation therebetween. Accordingly, in the case where the rotational speed of the compressor at the present time point is obtained on the basis of the compressor-outflow-air flow rate at the present time point and the compressor applied energy at the present time point is estimated on the basis of the obtained rotational speed of the compressor at the present time point as in the above-described configuration, the compressor applied energy can be accurately estimated. The cylinder-interior air quantity is then estimated on the basis of the estimated compressor applied energy at the present time point. As a result, the cylinder-interior air quantity can be accurately estimated.

The air quantity estimation apparatus for an internal combustion engine according to the present apparatus is also applied to an internal combustion engine having an intake passage for introducing outside air into a cylinder, a turbocharger including a compressor disposed in the intake passage and compressing air within the intake passage, and a throttle valve which is disposed in the intake passage to be located downstream of the turbocharger and whose opening can be adjusted to vary a quantity of air flowing through the intake passage. The air quantity estimation apparatus estimates a cylinder-interior air quantity which is a quantity of air having been introduced into the cylinder.

The air quantity estimation apparatus includes an air flowmeter, compressor-inflow-air-flow-rate estimation means and cylinder-interior-air-quantity estimation means.

The air flowmeter is disposed in the intake passage upstream of the compressor. The air flowmeter converts a flow rate of air passing through the intake passage, the flow rate being an input quantity, to an electrical physical quantity being an output quantity, and outputs the electrical physical quantity.

The compressor-inflow-air-flow-rate estimation means includes an inverse model which is a model inverse to a forward model of the air flowmeter, the forward model describing the relation between the input quantity and the output quantity of the air flowmeter, and is configured such that when an output quantity of the forward model is supplied to the inverse model as an input quantity, the inverse model outputs a corresponding input quantity of the forward model as an output quantity. The compressor-inflow-air-flow-rate estimation means supplies the electrical physical quantity actually output from the air flowmeter to the inverse model as the input quantity of the inverse model so as to obtain the output quantity of the inverse model as a compressor-inflow-air flow rate which is a flow rate of air actually flowing into the compressor at a present time point.

The cylinder-interior-air-quantity estimation means includes an air model which describes, in accordance with physical laws, behavior of air within the intake passage downstream of the compressor by use of at least the opening of the throttle valve and a compressor-outflow-air flow rate which is a flow rate of air flowing out of the compressor into the intake passage; throttle-valve-opening estimation means for estimating the opening of the throttle valve at a future time point after the present time point; and compressor-outflow-air-flow-rate estimation means for estimating the compressor-outflow-air flow rate at the future time point on the basis of the obtained compressor-inflow-air flow rate at the present time point, wherein The cylinder-interior-air-quantity estimation means estimates the cylinder-interior air quantity at the future time point by applying the estimated opening of the throttle valve at the future time point and the estimated compressor-outflow-air flow rate at the future time point to the air model.

By virtue of this configuration, the detection delay of the air flowmeter in relation to the actual compressor-inflow-air flow rate is compensated for. Therefore the compressor-inflow-air flow rate at the present time point can be accurately estimated. Further, the compressor-outflow-air flow rate at the future time point is estimated on the basis of the estimated compressor-inflow-air flow rate at the present time point, and the estimated compressor-outflow-air flow rate at the future time point is applied to the air model, whereby the cylinder-interior air quantity is estimated. As a result, the cylinder-interior air quantity at the future time point can be estimated accurately.

In this case, preferably, the air quantity estimation apparatus comprises present-compressor-downstream-pressure estimation means for estimating a compressor downstream pressure which is a pressure of air within the intake passage downstream of the compressor at the present time point;

the cylinder-interior-air-quantity estimation means includes future-compressor-downstream-pressure estimation means for estimating the compressor downstream pressure at a future time point after the present time point; and the compressor-outflow-air-flow-rate estimation means of the cylinder-interior-air-quantity estimation means includes:

compressor-operation-condition-relation storage means for previously storing a compressor operation condition relation which is a relation among the compressor-outflow-air flow rate, the compressor downstream pressure and the rotational speed of the compressor;

compressor-rotational-speed obtaining means for obtaining the rotational speed of the compressor at the present time point on the basis of the stored compressor operation condition relation, the obtained compressor-inflow-air flow rate at the present time point employed as the compressor-outflow-air flow rate at the present time point and the estimated compressor downstream pressure at the present time point; and future-compressor-outflow-air-flow-rate obtaining means for obtaining the compressor-outflow-air flow rate at the future time point on the basis of the stored compressor operation condition relation, the estimated compressor downstream pressure at the future time point and the obtained rotational speed of the compressor at the present time point employed as the rotational speed of the compressor at the future time point, wherein the cylinder-interior-air-quantity estimation means estimates the cylinder-interior air quantity at the future time point by use of the estimated compressor downstream pressure at the future time point and the obtained compressor-outflow-air flow rate at the future time point.

A strong correlation exists among the compressor-outflow-air flow rate, the compressor downstream pressure (the pressure of air within the intake passage downstream of the compressor) and the compressor rotational speed. Accordingly, in the case where the compressor operation condition relation, which is the relation among the compressor-outflow-air flow rate, the compressor downstream pressure and the rotational speed of the compressor, is previously stored as in the above-described configuration, the compressor rotational speed at the present time point can be obtained on the basis of the stored compressor operation condition relation, the estimated compressor downstream pressure at the present time point and the compressor-outflow-air flow rate at the present time point.

The compressor rotational speed hardly varies within a short period of time. Accordingly, if the obtained compressor rotational speed at the present time point is handled as the compressor rotational speed at the future time point, the compressor-outflow-air flow rate at the future time point can be accurately estimated on the basis of the stored compressor operation condition relation, the estimated compressor downstream pressure at the future time point and the compressor rotational speed at the future time point. In addition, the cylinder-interior air quantity at the future time point is estimated on the basis of the estimated compressor-outflow-air flow rate at the future time point. As a result, the cylinder-interior air quantity at the future time point can be accurately estimated.

In this case, preferably, the compressor-outflow-air-flow-rate estimation means of the cylinder-interior-air-quantity estimation means includes:

present-compressor-outflow-air-flow-rate obtaining means for obtaining the compressor-outflow-air flow rate at the present time point on the basis of the stored compressor operation condition relation, the estimated compressor downstream pressure at the present time point and the obtained rotational speed of the compressor at the present time point; and future-compressor-outflow-air-flow-rate correction means for correcting the compressor-outflow-air flow rate at the future time point obtained by the future-compressor-outflow-air-flow-rate obtaining means, on the basis of a ratio between (a) the compressor-inflow-air flow rate at the present time point, which is employed as the compressor-outflow-air flow rate at the present time point, obtained by the compressor-inflow-air-flow-rate estimation means and (b) the compressor-outflow-air flow rate at the present time point obtained by the present-compressor-outflow-air-flow-rate obtaining means.

For example, in the case where the compressor operation condition relation to be stored is given in the form of a table, preferably, the number of data sets constituting the table is small, in order to shorten the time required to search a desired data set from all the data sets constituting the table and to reduce the storage area of all the data sets. Incidentally, the compressor rotational speed varies within a considerably wide range. Accordingly, if the table is made by repeating an operation to vary the compressor rotational speed by a predetermined amount, conceivably the number of data sets of the table can be reduced by increasing the predetermined amount.

However, if the predetermined amount is increased, an error involved in the compressor rotational speed obtained from the table increases. Accordingly, when the compressor-outflow-air flow rate is obtained on the basis of the obtained compressor rotational speed and the table, there arises a problem in that an error involved in the obtained compressor-outflow-air flow rate increases.

Incidentally, an influence of the error contained in the compressor rotational speed appears similarly in the compressor-outflow-air flow rate at the present time point and the compressor-outflow-air flow rate at the future time point which are obtained by use of the above-described table and the compressor rotational speed involving the error. In other words, within a short period of time between the present time point and the future time point for which the cylinder-interior air quantity is estimated, the ratio between the compressor-outflow-air flow rate obtained by use of the table and involving the error and the true compressor-outflow-air flow rate can be considered not to vary greatly.

Accordingly, in the case where, as in the above-described configuration, the obtained compressor-outflow-air flow rate at the future time point is corrected on the basis of the ratio between the compressor-outflow-air flow rate at the present time point which is obtained on the basis of the table representing the compressor operation condition relation and the compressor rotational speed obtained by use of the table, and the estimated compressor-inflow-air flow rate at the present time point as the true compressor-outflow-air flow rate. As a result, the compressor-outflow-air flow rate at the future time point can be accurately estimated without increasing the number of data sets of the table.

In all the air quantity estimation apparatus described above, preferably, the compressor-inflow-air-flow-rate estimation means includes a feedback loop in which a value obtained by subtracting a predetermined feedback quantity from a predetermined input quantity is input to a PID controller, a quantity output from the PID controller is input to the forward model of the air flow model as an input quantity of the forward model, and an output quantity of the forward model is used as the predetermined feedback quantity. The compressor-inflow-air-flow-rate estimation means is configured to obtain the quantity output from the PID controller as the output quantity of the inverse model by giving the electrical physical quantity actually output from the air flowmeter as the predetermined input quantity.

When a transfer function of the forward model of the air flowmeter is represented by H, the transfer function of the inverse model configured as described above becomes a function sufficiently close to 1/H by properly setting the PID controller. Accordingly, even when a mathematically strict inverse model cannot be constructed because of complexity of the forward model, a sufficiently accurate inverse model can be readily constructed.

The air quantity estimation apparatus for an internal combustion engine according to the present apparatus is also applied to an internal combustion engine having an intake passage for introducing outside air into a cylinder, a turbocharger including a compressor disposed in the intake passage and compressing air within the intake passage, and a throttle valve which is disposed in the intake passage to be located downstream of the turbocharger and whose opening can be adjusted to vary a quantity of air flowing through the intake passage. The air quantity estimation apparatus estimates a cylinder-interior air quantity which is a quantity of air having been introduced into the cylinder.

The air quantity estimation apparatus includes a throttle position sensor, throttle-valve-opening calculation means, an air flowmeter, air-flowmeter-output quantity storage means, compressor-inflow-air-flow-rate estimation means and cylinder-interior-air-quantity estimation means.

The throttle position sensor converts an opening of the throttle valve, the opening being an input quantity, to a first electrical physical quantity being an output quantity, and outputs the first electrical physical quantity.

The throttle-valve-opening calculation means obtains the first electrical physical quantity actually output from the throttle position sensor every progress of a first predetermined time and calculates, on the basis of the obtained first electrical physical quantity, an actual opening of the throttle valve at a time point when the obtained first electrical physical quantity is output from the throttle position sensor.

The air flowmeter is disposed in the intake passage upstream of the compressor. The air flowmeter converts a flow rate of air passing through the intake passage, the flow rate being an input quantity, to a second electrical physical quantity being an output quantity, and outputs the second electrical physical quantity.

The air-flowmeter-output quantity storage means obtains the second electrical physical quantity actually output from the air flowmeter every progress of a second predetermined time and stores the obtained second electrical physical quantity.

The compressor-inflow-air-flow-rate estimation means includes an inverse model which is a model inverse to a forward model of the air flowmeter, the forward model describing the relation between the input quantity and the output quantity of the air flowmeter, and is configured such that when an output quantity of the forward model is supplied to the inverse model as an input quantity, the inverse model outputs a corresponding input quantity of the forward model as an output quantity. The second electrical physical quantity which was stored by the air-flowmeter-output quantity storage means at a time point in the vicinity of a time point at which the throttle position sensor output the first electrical physical quantity corresponding to the latest actual opening of the throttle valve of all the actual openings of the throttle valve having been calculated before the present time point is applied to the inverse model as the input quantity of the inverse model so as to obtain the output quantity of the inverse model as a compressor-inflow-air flow rate which is a flow rate of air actually flowing into the compressor at the present time point.

The cylinder-interior-air-quantity estimation means includes an air model which describes, in accordance with physical laws, behavior of air within the intake passage downstream of the compressor by use of at least the opening of the throttle valve and a compressor-outflow-air flow rate which is a flow rate of air flowing out of the compressor into the intake passage. In order to estimate the cylinder-interior air quantity, the latest actual opening of the throttle valve of all the actual openings of the throttle valve having been calculated before the present time point as the opening of the throttle valve at the present time point is applied to the air model, and the obtained compressor-inflow-air flow rate at the present time point employed as the compressor-outflow-air flow rate at the present time point is applied to the air model.

A throttle valve opening calculation time between a time point when the first electrical physical quantity (the output quantity of the throttle position sensor) is output and a time point when the actual opening of the throttle valve is calculated on the basis of the first electrical physical quantity is longer than a compressor-inflow-air flow rate estimation time between a time point when the second electrical physical quantity (the output quantity of the air flowmeter) is output and a time point when the actual compressor-inflow-air flow rate is obtained on the basis of the second electrical physical quantity, because correction, etc. are performed on the basis of various calculations.

Therefore, even in the case where the time point when the actual opening of the throttle valve is calculated generally coincides with the time point when the actual compressor-inflow-air flow rate is obtained, the time point at which the output quantity of the throttle position sensor (first electrical physical quantity), from which the actual opening of the throttle valve is calculated, is output is earlier than the time point at which the output quantity of the air flowmeter (second electrical physical quantity), from which the actual compressor-inflow-air flow rate is obtained, is output by the difference between the throttle valve opening calculation time and the compressor-inflow-air flow rate estimation time.

Accordingly, if the actual compressor-inflow-air flow rate is obtained on the basis of the latest output quantity of the air flowmeter of all the output quantities of the air flowmeter having been obtained before the present time point, and the obtained actual compressor-inflow-air flow rate and the latest actual opening of the throttle valve of all the actual openings of the throttle valve having been calculated before the present time point are applied to the air model, the opening of the throttle valve (throttle valve opening) and the compressor-inflow-air flow rate based on the electrical physical quantities output at different time points, respectively, are applied to the air model. Therefore the cylinder-interior air quantity cannot be accurately estimated.

In contrast, according to the above-described configuration, the output quantity of the air flowmeter is stored every progress of the predetermined time; and the actual compressor-inflow-air flow rate at the present time point is obtained on the basis of the output quantity of the air flowmeter which was stored at a time point in the vicinity of a time point at which the throttle position sensor output the output quantity from which the latest actual opening of the throttle valve of all the actual openings of the throttle valve having been calculated before the present time point was calculated.

Moreover, the latest actual opening of the throttle valve of all the actual openings of the throttle valve having been calculated before the present time point and the obtained compressor-inflow-air flow rate at the present time point are applied to the air model. By virtue of this configuration, the opening of the throttle valve and the compressor-inflow-air flow rate based on the electrical physical quantities output at mutually close time points, respectively, can be applied to the air model. As a result, the cylinder-interior air quantity can be accurately estimated.

DETAILED DESCRIPTION OF PREFERRED EMBODIMENT

Figure 1:
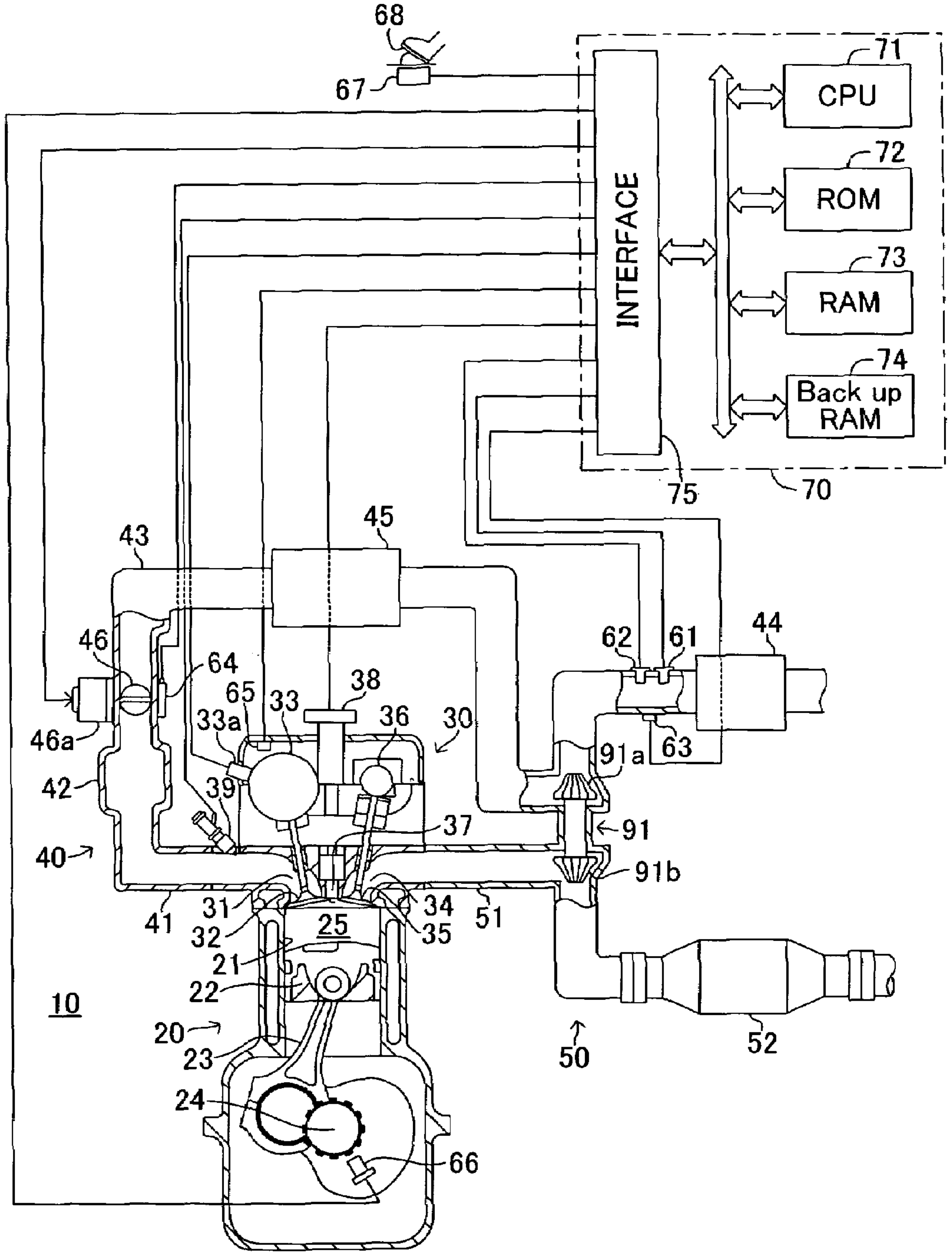
FIG. 1 is a schematic configuration diagram of a system configured such that an air quantity estimation apparatus according to an embodiment of the present invention is applied to a spark-ignition multi-cylinder internal combustion engine.

An embodiment of an air quantity estimation apparatus for an internal combustion engine according to the present invention will be described with reference to the drawings. FIG. 1 shows a schematic configuration of a system configured such that the air quantity estimation apparatus is applied to a spark-ignition multi-cylinder (e.g., 4-cylinder) internal combustion engine. FIG. 1 shows only a cross section of a specific cylinder; however, the remaining cylinders have the similar configuration.

The internal combustion engine 10 includes a cylinder block section 20 including a cylinder block, a cylinder block lower-case and an oil pan; a cylinder head section 30 fixed on the cylinder block section 20; an intake system 40 for supplying gas mixture of fuel and air to the cylinder block section 20; and an exhaust system 50 for emitting exhaust gas from the cylinder block section 20 to the exterior of the engine.

The cylinder block section 20 includes cylinders 21, pistons 22, connecting rods 23 and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and a head of the piston 22, together with the cylinder head section 30, form a combustion chamber (cylinder) 25.

The cylinder head section 30 includes an intake port 31 communicating with the combustion chamber 25; an intake valve 32 for opening and closing the intake port 31; a variable intake timing unit 33 including an intake cam shaft for driving the intake valve 32 and continuously varying a phase angle of the intake cam shaft; an actuator 33*a* of the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector 39 for injecting fuel into the intake port 31.

The intake system 40 includes an intake manifold 41 communicating with the intake port 31; a surge tank 42 communicating with the intake manifold 41; an intake duct 43 whose one end is connected to the surge tank 42 and which forms an intake passage together with the intake port 31, the intake manifold 41 and the surge tank 42; and an air filter 44, a compressor 91*a* of a turbocharger 91, an intercooler 45, a throttle valve 46, and a throttle valve actuator 46*a*, which are successively disposed in the intake duct 43 toward the downstream side (the surge tank 42) from the other end of the intake duct 43. Notably, the intake passage extending from the outlet (downstream) of the compressor 91*a* to the throttle valve 46 forms an intercooler section (throttle-valve upstream section) in cooperation with the intercooler 45. Further, the intake passage extending from the throttle valve 46 to the intake valve 32 forms an intake pipe section (throttle-valve downstream section).

The intercooler 45 is of an air cooling type and cools air passing through the intake passage by means of air outside the engine 10.

The throttle valve 46 is rotatably supported on the intake duct 43. The opening of the throttle valve 46 can be adjusted by the throttle valve 46 being driven by the throttle valve actuator 46*a*. Thus, the throttle valve 46 varies the cross-sectional area of the passage of the intake duct 43. The opening of the throttle valve 46 (throttle valve opening) is defined by an angle by which the throttle valve 46 has rotated from the position where the throttle valve 46 minimizes the cross-sectional area of the passage.

The throttle valve actuator 46*a*, which consists of a DC motor, drives the throttle valve 46 such that an actual throttle valve opening θta coincides with a target throttle valve opening θtt, in response to a drive signal which is sent by an electric control device 70, which will be described later, achieving a function of an electronic control throttle valve logic, which will be described later.

The exhaust system 50 includes an exhaust pipe 51 including an exhaust manifold, which communicates with the exhaust ports 34, and forming an exhaust passage together with the exhaust ports 34; a turbine 91*b* of the turbocharger 91 disposed within the exhaust pipe 51; and a 3-way catalytic converter 52 disposed in the exhaust pipe 51 downstream of the turbine 91*b*.

By virtue of such an arrangement, the turbine 91*b* of the turbocharger 91 is rotated by means of energy of exhaust gas. The turbine 91*b* is connected to the compressor 91*a* of the intake system 40 through a shaft. Therefore, the compressor 91*a* of the intake system 40 rotates together with the turbine 91*b* so as to compress air within the intake passage. That is, the turbocharger 91 supercharges air into the engine 10 by making use of the energy of exhaust gas.

Meanwhile, this system includes a hot-wire air flowmeter 61; an intake-air temperature sensor 62; an intake-air pressure sensor 63; a throttle position sensor 64; a cam position sensor 65; a crank position sensor 66; an accelerator opening sensor 67 (operation state quantity obtaining means) and an electric control device 70.

Figure 2:
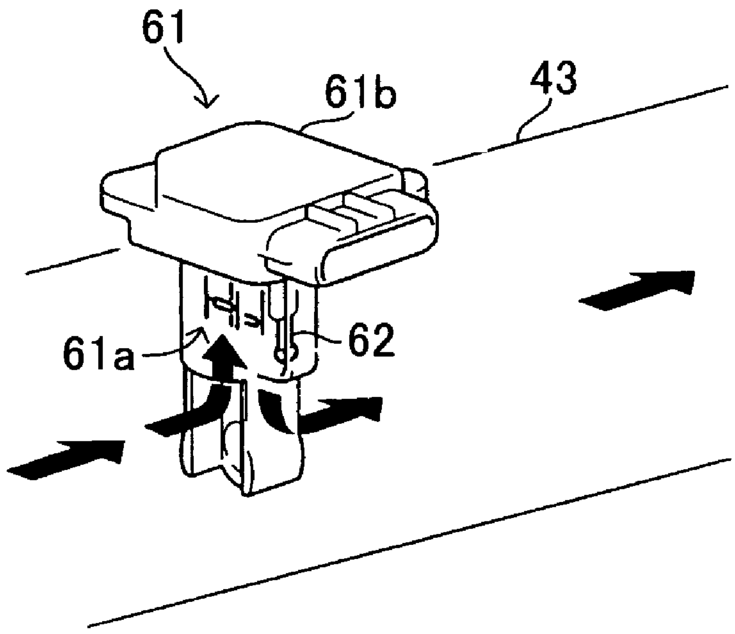
FIG. 2 is a schematic perspective view of an air flowmeter shown in FIG. 1.

As shown in FIG. 2 being the schematic perspective view of the air flowmeter 61, the air flowmeter 61 includes a bypass passage into which a portion of air flowing through the intake duct 43 flows; a hot-wire measuring portion 61*a* disposed in the bypass passage; and a signal processing portion 61*b* connected to the hot-wire measuring portion 61*a*.

Figure 3:
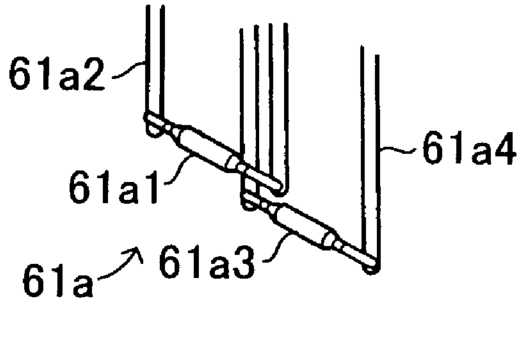
FIG. 3 is an enlarged perspective view of a hot-wire measuring portion of the air flowmeter shown in FIG. 2.

As shown in FIG. 3 being an enlarged perspective view of the hot-wire measuring portion 61*a*, the hot-wire measuring portion 61*a* includes an intake-air-temperature-measuring resistor (a bobbin portion) 61*a*1 consisting of a platinum hot-wire; a support portion 61*a*2 that connects the intake-air-temperature-measuring resistor 61*a*1 to the signal processing portion 61*b* to thereby hold the resistor 61*a*1; a heating resistor (heater) 61*a*3; and a support portion 61*a*4 that connects the heating resistor 61*a*3 to the signal processing portion 61*b* to thereby hold the resistor 61*a*3.

The signal processing portion 61*b* has a bridge circuit including the intake-air-temperature-measuring resistor 61*a*1 and the heating resistor 61*a*3; regulates, by use of the bridge circuit, power to be supplied to the heating resistor 61*a*3 in such a manner as to maintain a constant temperature difference between the intake-air-temperature-measuring resistor 61*a*1 and the heating resistor 61*a*3; converts the supplied power to voltage Vafm; and outputs the voltage Vafm.

By virtue of such a configuration, the air flowmeter 61 converts the flow rate of air passing through the intake passage (intake duct 43), which is an input quantity, to the above-described voltage Vafm, which is an electrical physical quantity (output quantity), and outputs the voltage Vafm.

The intake-air temperature sensor 62 is set within the air flowmeter 61 and detects the temperature of intake air (intake-air temperature) and outputs a signal representing the intake-air temperature Ta. The atmospheric-pressure sensor 63 detects the pressure of intake air (intake-air pressure) and outputs a signal representing the intake-air pressure Pa.

The throttle position sensor 64 converts the opening of the throttle valve 46 (throttle valve opening), which is an input quantity, to voltage Vta, which is an electrical physical quantity (output quantity) varying in accordance with the throttle valve opening, and outputs the voltage Vta.

The cam position sensor 65 generates a signal (G2 signal) having a single pulse every time the intake cam shaft rotates by 90 degrees (i.e., every time the crankshaft 24 rotates by 180 degrees).

The crank position sensor 66 outputs a signal having a narrow pulse every time the crankshaft 24 rotates by 10 degrees and having a wide pulse every time the crankshaft 24 rotates by 360 degrees. This signal represents the engine speed NE. The accelerator opening sensor 67 detects an operation amount of an accelerator pedal 68 operated by a driver and outputs a signal representing the operation amount of the accelerator pedal (accelerator pedal operation amount) Accp.

The electric control device 70 is a microcomputer, which includes the following elements mutually connected through a bus: a CPU 71; a ROM 72 in which programs to be executed by the CPU 71, tables (lookup tables, maps), constants and the like are stored in advance; a RAM 73 in which the CPU 71 temporarily stores data as needed; a backup RAM 74, which stores data while power is held on and which retains the stored data even while power is held off; and an interface 75 including an AD converter. The interface 75 is connected to the above-mentioned sensors 61 to 67. The signals from the sensors 61 to 67 are supplied to the CPU 71 through the interface 75. Drive signals (instruction signals) from the CPU 71 are sent, through the interface 75, to the actuator 33*a* of the variable intake timing unit 33, the igniter 38, the injector 39 and the throttle valve actuator 46*a*.

Next will be described how the thus-configured air quantity estimation apparatus for the internal combustion engine estimates a cylinder-interior air quantity.

In the engine 10 to which this air quantity estimation apparatus is applied, the injector 39 is disposed upstream of the intake valve 32. Therefore, fuel must be injected by the time the intake valve 32 is closed, and thus an intake stroke is ended (intake valve closure time). Accordingly, in order to determine a fuel injection quantity which renders an air-fuel ratio of a gas mixture formed in the cylinder coincident with a target air-fuel ratio, this air quantity estimation apparatus must estimate, at a predetermined time before the fuel injection, the cylinder-interior air quantity KLfwd at the intake valve closure time.

In view of the above, the present air quantity estimation apparatus estimates the pressure Pm and temperature Tm of air within the intake-pipe section and the pressure Pic and temperature Tic of air within the intercooler section at a future time point after the present time point, by use of a physical model constructed on the basis of physical laws, such as the law of conservation of energy, the law of conservation of momentum and the law of conservation of mass, and estimates the cylinder-interior air quantity KLfwd at the future time point on the basis of the estimated pressure Pm and temperature Tm of air within the intake-pipe section and the estimated pressure Pic and temperature Tic of air within the intercooler section at the future time point.

As the physical model for estimating the pressure Pic and temperature Tic of air within the intercooler section at the future time point, the present air quantity estimation apparatus employs a physical model which uses a compressor-outflow-air flow rate mcm which is a flow rate of air flowing out of the compressor 91*a* at the future time point. Accordingly, the present air quantity estimation apparatus must estimate the compressor-outflow-air flow rate mcm at the future time point.

For such estimation, the present air quantity estimation apparatus estimates a compressor-inflow-air flow rate mcmi which is a flow rate of air flowing into the compressor 91*a* at the present time point, on the basis of the output quantity Vafm of the air flowmeter 61 disposed in the intake passage upstream of the compressor 91*a*, and then estimates a rotational speed Ncm of the compressor 91*a* (compressor rotational speed) at the present time point on the basis of the estimated compressor-inflow-air flow rate mcmi. Further, the present air quantity estimation apparatus estimates the compressor-outflow-air flow rate mcm at the future time point on the basis of the compressor rotational speed Ncm at the present time point.

Incidentally, the output quantity Vafm of the air flowmeter 61 varies with time delay in relation to the actual compressor-inflow-air flow rate mcmi. In view of this, the present air quantity estimation apparatus inputs the output quantity Vafm of the air flowmeter 61 to an inverse model of the air flowmeter 61, to thereby estimate the actual compressor-inflow-air flow rate mcmi compensated for the above-mentioned detection delay. The inverse model of the air flowmeter 61 is a model configured such that when an output quantity of a forward model of the air flowmeter 61 which describes the relation between the input and output quantities of the air flowmeter 61 is given to the model as an input quantity, the model outputs the input quantity of the forward model as an output quantity.

In this manner, the present air quantity estimation apparatus estimates the cylinder-interior air quantity KLfwd at a future time point after the present time point.

Figure 4:
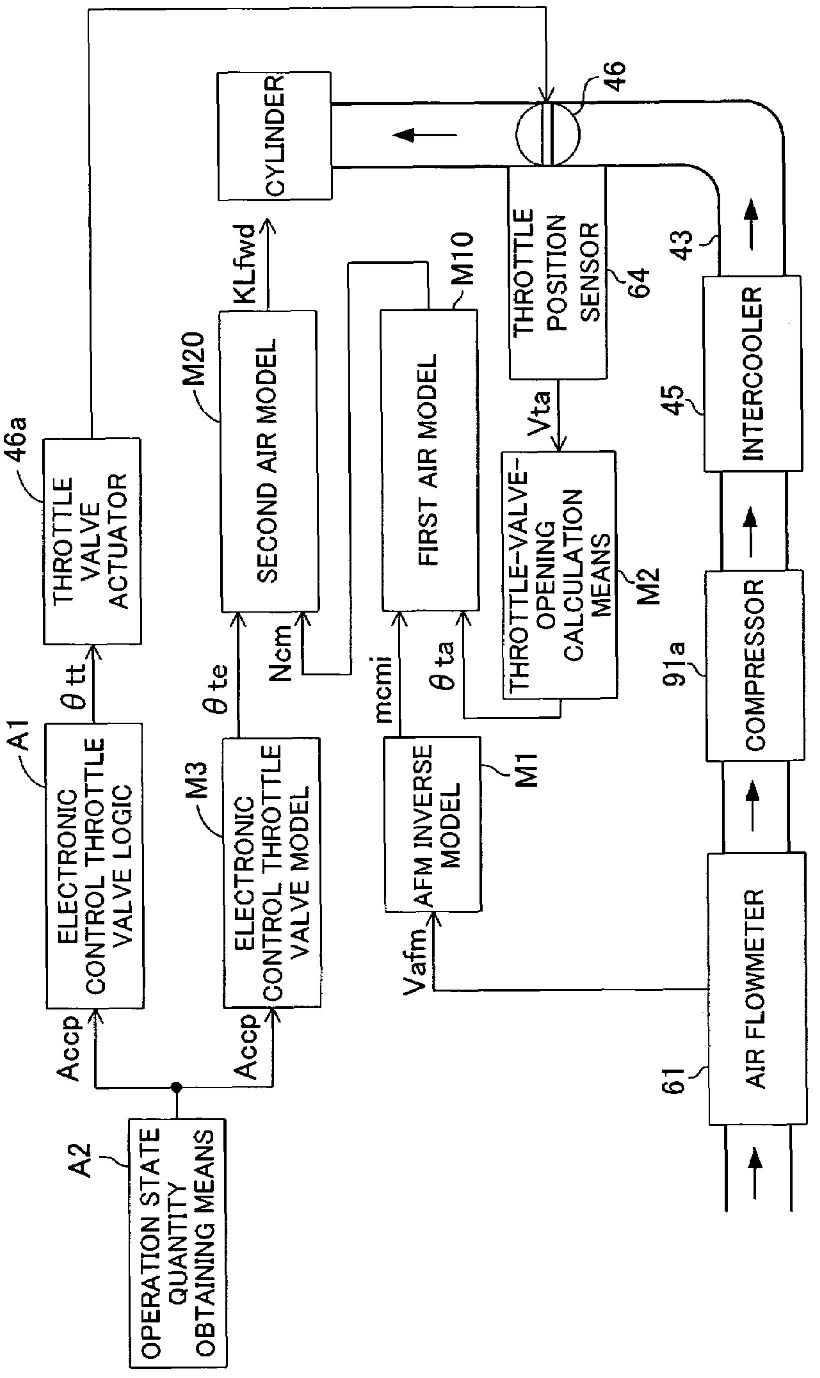
FIG. 4 is a functional block diagram of a logic and various models for controlling a throttle valve opening and estimating a cylinder-interior air quantity.

Specifically, as shown in a functional block diagram of FIG. 4, the present air quantity estimation apparatus includes an inverse model (AFM inverse model) M1 of the air flowmeter 61, throttle-valve-opening calculation means M2 and an electronic control throttle valve model M3. In addition, the present air quantity estimation apparatus includes a first air model M10 and a second air model M20 as the above-described physical model. Further, the present air quantity estimation apparatus includes an electronic control throttle valve logic A1.

The present air quantity estimation apparatus estimates an actual compressor-inflow-air flow rate mcmi compensated for the above-mentioned detection delay on the basis of the output quantity Vafm of the air flowmeter 61 by use of the AFM inverse model M1. Further, the present air quantity estimation apparatus calculates an actual throttle valve opening θta on the basis of the output quantity Vta of the throttle position sensor 64 by means of the throttle-valve-opening calculation means M2. The present air quantity estimation apparatus then applies the actual compressor-inflow-air flow rate mcmi compensated for the detection delay and the calculated actual throttle valve opening θta to the first air model M10 to thereby estimate a compressor rotational speed Ncm at the present time point.

Meanwhile, the present air quantity estimation apparatus controls the opening of the throttle valve 46 by means of the electronic control throttle valve logic A1 and estimates a throttle valve opening θte at the future time point after the present time point by means of the electronic control throttle valve model M3.

Incidentally, the compressor rotational speed Ncm does not vary greatly within a short period of time. Therefore, the present air quantity estimation apparatus estimates the cylinder-interior air quantity KLfwd at the future time point by applying the estimated throttle valve opening θte at the future time point and the compressor rotational speed Ncm at the present time point employed as a compressor rotational speed Ncm at the future time point to the second air model M20.

The models and logic will now be described individually and specifically. Notably, a value of any variable whose suffix is a numeral "1" denotes a value which represents a physical quantity at the present time point mainly used in the first air model M1. In addition, a value of any variable whose suffix is a numeral "2" denotes a value which represents a physical quantity at the future time point mainly used in the second air model M20.

<AFM Inverse Model M1>

Figure 5:
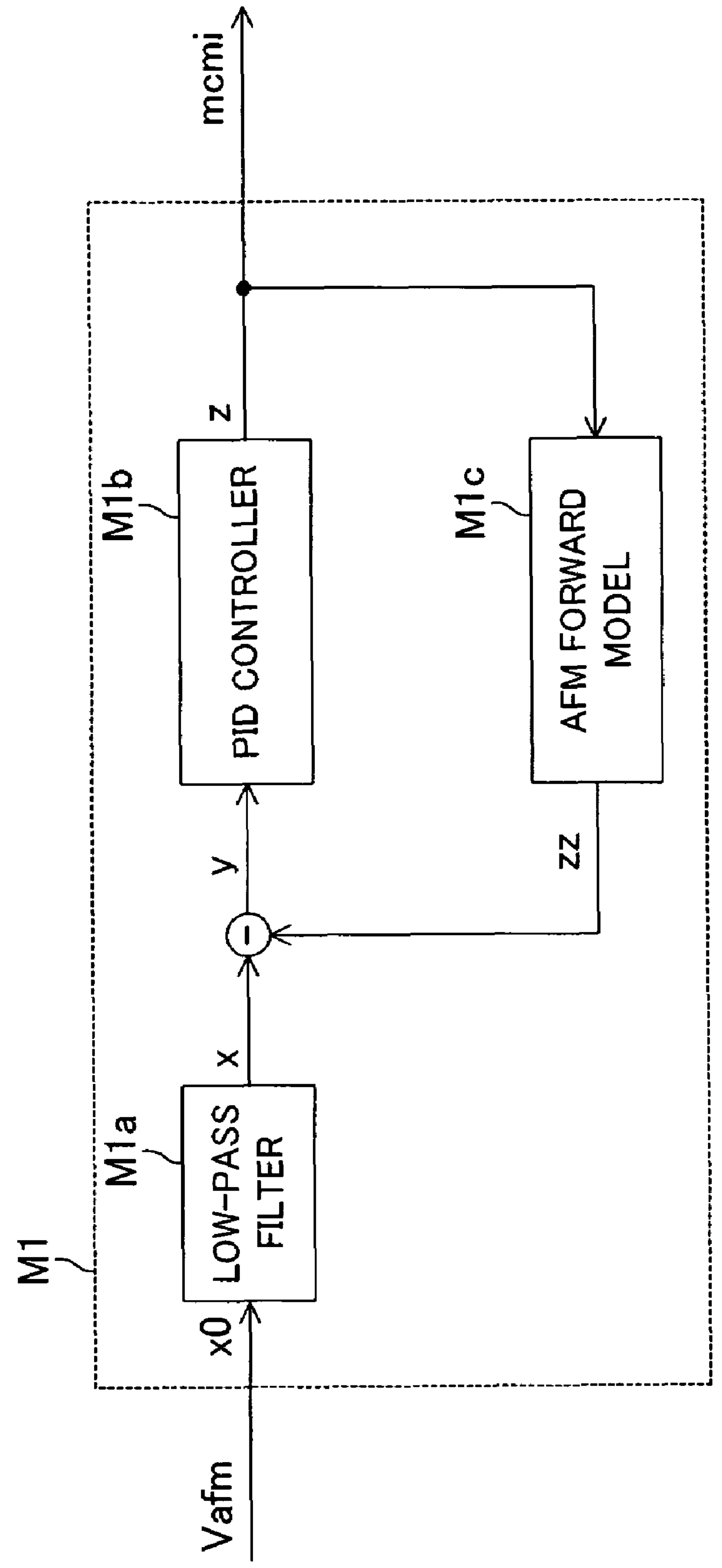
FIG. 5 is a detailed functional block diagram of an AFM inverse model shown in FIG. 4.

The AFM inverse model M1 estimates the flow rate (compressor-inflow-air flow rate) mcmi of air actually flowing into the compressor 91*a* at the present time point on the basis of the output quantity Vafm of the air flowmeter 61. As shown in FIG. 5, the AFM inverse model M1 includes a low-pass filter M1*a*, a PID controller M1*b* and a forward model (AFM forward model) M1*c* of the air flowmeter 61.

When an input quantity is given to the low-pass filter M1*a* at a predetermined interval, the low-pass filter M1*a* performs processing of attenuating the amplitudes of high-frequency components of a waveform formed by means of a series of data of the given input quantity (removing noise components). The low-pass filter M1*a* then outputs, as an output quantity, a quantity obtained by removing noise components from the input quantity.

The PID controller M1*b* includes a proportional element, a differentiating element and an integrating element; and the gains of the elements are set such that the AFM inverse model M1 can accurately calculate the compressor-inflow-air flow rate mcmi.

The AFM forward model M1*c* is a model which describes the relation between the output quantity Vafm of the air flowmeter 61 and the actual compressor-inflow-air flow rate mcmi (the input quantity of the air flowmeter 61) so as to simulate the above-described detection delay. That is, the AFM forward model M1*c* enables estimation of the output quantity Vafm of the air flowmeter 61 on the basis of the actual compressor-inflow-air flow rate mcmi. The details of the AFM forward model M1*c* are well known and are described in, for example, Japanese Patent Application Laid-Open (kokai) No. 2000-320391. Accordingly, in the present specification, a detailed description of the AFM forward model M1*c* is not repeated, and only its outline will be described.

When the actual compressor-inflow-air flow rate mcmi is input, the AFM forward model M1*c* obtains a steady heat radiation amount W on the basis of the input actual compressor-inflow-air flow rate mcmi and a table which defines a relation between the compressor-inflow-air flow rate mcmi and a heat radiation amount (steady heat radiation amount or complete heat radiation amount) W of the intake-air-temperature-measuring resistor 61*a*1 in a state in which the compressor-inflow-air flow rate mcmi does not vary (steady state). The AFM forward model M1*c* performs processing (first-order lagging processing) which delays a variation in the obtained steady heat radiation amount W, in accordance with the following Equation (1), which represents a relation between the obtained steady heat radiation amount W and a heat radiation amount (transition heat radiation amount, response heat radiation amount) ω of the intake-air-temperature-measuring resistor 61*a*1 in a state in which the compressor-inflow-air flow rate mcmi varies (transition state), and calculates a heat radiation amount ω involving the detection delay. Here, τ is a time constant calculated on the basis of the compressor-inflow-air flow rate mcmi.

$$\frac{d\omega}{dt} = \frac{1}{\tau}(W - \omega) \tag{1}$$

The AFM forward model M1*c* estimates the output quantity Vafm of the air flowmeter 61 on the basis of the calculated heat radiation amount ω and a table which defines a relation between the heat radiation amount ω and the output quantity Vafm of the air flowmeter 61. In this manner, the AFM forward model M1*c* estimates the output quantity Vafm of the air flowmeter 61 on the basis of the actual compressor-inflow-air flow rate mcmi at the present time point.

The AFM inverse model M1 configured as described above provides the output quantity Vafm of the air flowmeter 61 to the low-pass filter M1*a* as an input quantity x0 every time a predetermined computation period elapses. The AFM inverse model M1 obtains from the low-pass filter M1*a* an output quantity x produced by attenuating noise components of the input quantity x0. The AFM inverse model M1 provides to the PID controller M1*b* a quantity y which is obtained by subtracting an output quantity zz of the AFM forward model M1*c* from the output quantity x, as an input quantity y. The AFM inverse model M1 obtains an output quantity z from the PID controller M1*b*. The AFM inverse model M1 provides the output quantity z to the AFM forward model M1*c* as an input quantity z and outputs the output quantity z as an actual compressor-inflow-air flow rate mcmi at the present time point.

Herein below, there will be described the reason why when the output quantity Vafm of the air flowmeter 61 is input to the AFM inverse model M1, the output quantity of the AFM inverse model M1 represents the actual compressor-inflow-air flow rate mcmi at the present time point.

The relation between the input quantity y provided to the PID controller M1*b* and the output quantity z output from the PID controller M1*b* is represented by the following Equation (2). Here, G is a transfer function corresponding to the PID controller M1*b*.

$$z=G\cdot y \tag{2}$$

Since the input quantity y provided to the PID controller M1*b* is the quantity obtained by subtracting the output quantity zz of the AFM forward model M1*c* from the output quantity x of the low-pass filter M1*a*, the input quantity y is represented by the following Equation (3).

$$y=x-zz \tag{3}$$

The relation between the input quantity z provided to the AFM forward model M1*c* and the output quantity zz output from the AFM forward model M1*c* is represented by the following Equation (4). Here, H is a transfer function corresponding to the AFM forward model M1*c*.

$$zz=H\cdot z \tag{4}$$

When Equation (3) is substituted for y in Equation (2) so as to eliminate y, the following Equation (5) is obtained.

$$z=(x-zz)\cdot G \tag{5}$$

Further, When Equation (4) is substituted for zz in Equation (5) so as to eliminate zz, and then the resultant equation is solved for z/x, the following Equation (6) is obtained.

$$z/x=G/(1+G\cdot H) \tag{6}$$

In addition, in the case when the gains of the individual elements of the transfer function G are set such that the value of |G·H| becomes sufficiently larger than 1, when the right side of Equation (6) is multiplied by H and 1/H, the following Equation (7) is obtained, in that G·H/(1+G·H) can be approximated to 1.

$$\frac{z}{x} = \frac{G}{1+G\cdot H} = \left(\frac{G\cdot H}{1+G\cdot H}\right)\frac{1}{H} \approx \frac{1}{H} \tag{7}$$

According to Equation (7), a practical transfer function corresponding to the AFM inverse model M1 is an inverse function 1/H of the transfer function corresponding to the AFM forward model M1*c*. That is, the AFM inverse model M1 can be said to constitute an inverse model in which when an output quantity of the AFM forward model M1*c* is provided to the model as an input quantity, the model outputs an input quantity of the AFM forward model M1*c* as an output quantity. Therefore, when the output quantity Vafm of the air flowmeter 61 is input to the AFM inverse model M1, the AFM inverse model M1 outputs the actual compressor-inflow-air flow rate mcmi at the present time point.

As described above, a sufficiently accurate inverse model can be readily constructed, without obtaining an inverse function mathematically, by means of configuring the AFM inverse model M1 such that the AFM inverse model M1 includes a feedback loop in which a value y obtained by subtracting a feedback quantity zz from an input quantity x is input to the PID controller M1*b*, a quantity z output from the PID controller M1*b* is input to the AFM forward model M1*c*, and an output quantity zz of the AFM forward model M1*c* is used as the above-mentioned feedback quantity; and that the AFM inverse model M1 outputs, as its output quantity mcmi, the quantity z output from the PID controller M1*b*.

<Throttle-valve-opening Calculation Means M2>

The throttle-valve-opening calculation means M2 calculates an actual opening of the throttle valve 46 (throttle valve opening) θta at the present time point on the basis of the output quantity Vta of the throttle position sensor 64. The details of the throttle-valve-opening calculation means M2 are well known and are described in, for example, Japanese Patent Application Laid-Open (kokai) No. H9-126036. Accordingly, in the present specification, a detailed description of the throttle-valve-opening calculation means M2 is not repeated, and only its outline will be described.

In a steady operation state in which the throttle valve opening does not vary, the throttle-valve-opening calculation means M2 obtains a reference cylinder-interior air quantity KLstd from a table MAPKL which defines a relation between the engine speed NE and the throttle valve opening θta and the cylinder-interior air quantity KL; the engine speed NE; and a throttle valve opening θta0 obtained on the basis of the output quantity Vta of the throttle position sensor 64 and a correction value Δθ. Further, the throttle-valve-opening calculation means M2 obtains an actual cylinder-interior air quantity KLa on the basis of the output quantity Vafm of the air flowmeter 61.

In addition, the throttle-valve-opening calculation means M2 compares the obtained reference cylinder-interior air quantity KLstd and the obtained actual cylinder-interior air quantity KLa and changes the correction value Δθ such that the difference between the obtained reference cylinder-interior air quantity KLstd and the obtained actual cylinder-interior air quantity KLa decreases sufficiently. Moreover, the throttle-valve-opening calculation means M2 calculates the actual throttle valve opening θta on the basis of the output quantity Vta of the throttle position sensor 64 and the changed correction value Δθ.

<First Air Model M10>

Figure 6:
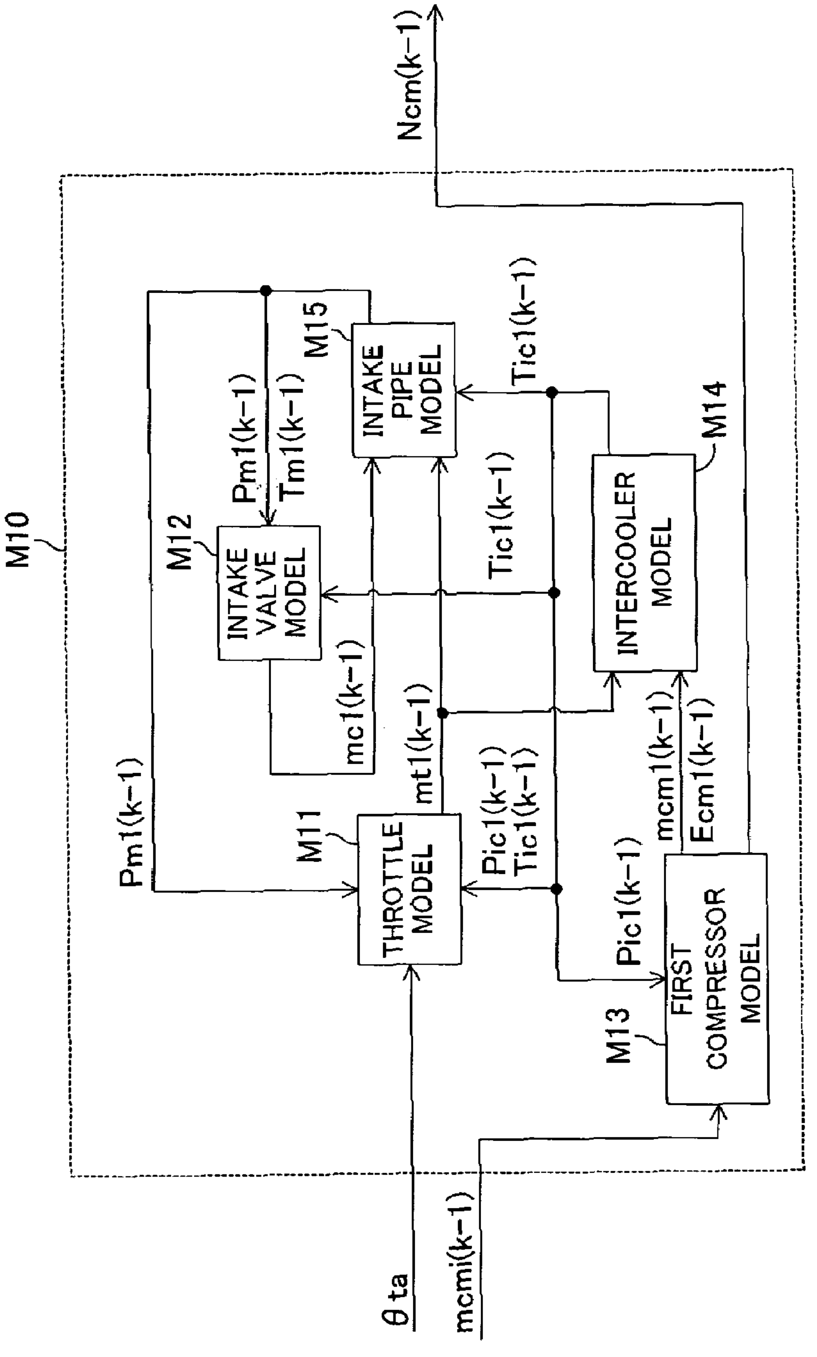
FIG. 6 is a detailed functional block diagram of a first air model shown in FIG. 4.

The first air model M10 estimates the compressor rotational speed Ncm at the present time point on the basis of the actual compressor-inflow-air flow rate mcmi at the present time point estimated by means of the AFM inverse model M1 and the actual throttle valve opening θta calculated by means of the throttle-valve-opening calculation means M2. As shown in FIG. 6, the first air model M10 includes a throttle model M11, an intake valve model M12, a first compressor model M13, an intercooler model M14 and an intake pipe model M15, which constitute an air model modeling the behavior of air within the intake passage downstream of the compressor 91*a* in the engine 10 equipped with the turbocharger 91.

As will be described later, some mathematical formulas that represent the models M11 to M15 of the first air model M10 and are derived on the base of the above-described physical laws (hereinafter, the formulas may be also referred to as "generalized mathematical formulas") include time-differential terms regarding the pressure Pic and temperature Tic of air within the intercooler section and the pressure Pm and temperature Tm of air within the intake pipe section. In order to enable calculation to be performed by a microcomputer, the first air model M10 discretizes the mathematical formulas including the time-differential terms and estimates a physical quantity at the next computation time, which is later than the present computation time by a predetermined computation interval (computation period), on the basis of the discretized mathematical formulas and a physical quantity estimated as a physical quantity at the present computation time.

By repeating such estimation, the first air model M10 estimates the physical value at the next computation time (a time point which is later than the present time point by the computation period) every time the computation period elapses. That is, the first air model M10 successively estimates the physical quantity for each computation period by repeatedly estimating the physical quantity. In the following description, a variable to which (k−1) is added representing a physical quantity is a variable representing the physical quantity estimated at the time of the (k−1)-th time estimation (at the time of previous computation). Further, a variable to which k is added representing a physical quantity is a variable representing the physical quantity estimated at the time of the k-th time estimation (at the time of present computation).

The individual models shown in FIG. 6 will now be described specifically. Notably, since methods of deriving formulas representing the throttle model M11, the intake valve model M12 and the intake pipe model M15 are well known (see Japanese Patent Application Laid-Open (kokai) Nos. 2001-41095 and 2003-184613), in the present specification, detailed descriptions thereof are not repeated.

(Throttle Model M11)

The throttle model M11 estimates the flow rate (throttle-passing-air flow rate) mt of air passing around the throttle valve 46 on the basis of the following Equations (8), (9-1) and (9-2), which are generalized mathematical formulas representing the present model and derived on the basis of physical laws such as the law of conservation of energy, the law of conservation of momentum, the law of conservation of mass and the equation of state. In Equation (8), Ct(θt) represents a flow rate coefficient which varies in accordance with the throttle valve opening θt; At(θt) represents a throttle opening cross sectional area (the cross sectional area of an opening around the throttle valve 46 within the intake passage) which varies in accordance with the throttle valve opening θt; Pic represents an intercooler section interior pressure which is the pressure of air within the intercooler section (that is, compressor downstream pressure (throttle valve upstream pressure) which is the pressure of air within the intake passage extending from the turbocharger 91 to the throttle valve 46); Pm represents an intake-pipe section interior pressure which is the pressure of air within the intake pipe section (that is, throttle valve downstream pressure which is the pressure of air within the intake passage extending from the throttle valve 46 to the intake valve 32); Tic represents an intercooler section interior temperature which is the temperature of air within the intercooler section (that is, compressor downstream temperature (throttle valve upstream temperature) which is the temperature of air within the intake passage extending from the turbocharger 91 to the throttle valve 46); R represents the gas constant; and κ represents the specific heat ratio of air (hereinafter, κ will be handled as a constant value).

$$mt = Ct(\theta t)\cdot At(\theta t)\cdot\frac{Pic}{\sqrt{R\cdot Tic}}\cdot\Phi(Pm/Pic) \tag{8}$$

$$\Phi(Pm/Pic) = \sqrt{\frac{\kappa}{2\cdot(\kappa+1)}}\quad\text{for the case where }\frac{Pm}{Pic}\leqq\frac{1}{\kappa+1} \tag{9-1}$$

$$\Phi(Pm/Pic) = \sqrt{\left\{\frac{\kappa-1}{2\kappa}\left(1-\frac{Pm}{Pic}\right)+\frac{Pm}{Pic}\right\}\left(1-\frac{Pm}{Pic}\right)}\quad\text{for the case where }\frac{Pm}{Pic}>\frac{1}{\kappa+1} \tag{9-2}$$

Here, it is empirically known that the product Ct(θt)·At(θt) of the flow rate coefficient Ct(θt) and the throttle opening cross sectional area At(θt) on the right side of Equation (8) can be determined on the basis of the throttle valve opening θt. Accordingly, the value Ct(θt)·At(θt) is obtained on the basis of a table MAPCTAT which defines a relation between the throttle valve opening θt and the value Ct(θt)·At(θt), and the throttle valve opening θt. The throttle model M11 uses the table MAPCTAT stored in the ROM 72. Further, the throttle model M11 uses a table MAPΦ, which is stored in the ROM 72, defining a relation between the value Pm/Pic and the value Φ(Pm/Pic).

The throttle model M11 estimates the throttle-passing-air flow rate mt by use of Equations (8), (9-1) and (9-2), the table MAPCTAT and the table MAPΦ. More specifically, the throttle model M11 obtains a value Ct1(θta)·At1(θta)

(=MAPCTAT(θta) from the table MAPCTAT and the actual throttle valve opening θta calculated by the throttle-valve-opening calculation means M2.

Moreover, the throttle model M11 obtains the value Φ1(Pm1(k−1)/Pic1(k−1) (=MAPΦ(Pm1(k−1)/Pic1(k−1)) on the basis of the table MAPΦ and the value (Pm1(k−1)/Pic1(k−1)) which is a value obtained by dividing the intake-pipe section interior pressure Pm1(k−1) which was estimated at the time of the (k−1)-th time estimation by the intake pipe model M15 to be described later, by the intercooler section interior pressure Pic1(k−1) which was estimated at the time of the (k−1)-th time estimation by the intercooler model M14 to be described later.

The throttle model M11 applies to Equation (8) the value Ct1(θta)·At1(θta) and the value Φ1(Pm1(k−1)/Pic1(k−1)), which have been obtained as described above; and the intercooler section interior pressure Pic1(k−1) and intercooler section interior temperature Tic1(k−1), which were estimated at the time of the (k−1)-th time estimation by the intercooler model M14 to be described later, whereby the throttle-passing-air flow rate mt1*(k−1) is obtained.

(Intake Valve Model M12)

The intake valve model M12 estimates a cylinder-inflow-air flow rate mc which is a flow rate of air flowing into the cylinder (into the combustion chamber 25) after passing around the intake valve 32, on the basis of the intake-pipe section interior pressure Pm, which is the pressure of air within the intake pipe section, and the intake-pipe section interior temperature Tm which is the temperature of air within the intake-pipe section (that is, the throttle valve downstream temperature which is the temperature of air within the intake passage extending from the throttle valve 46 to the intake valve 32), etc. The pressure within the cylinder during a period corresponding to an intake stroke (including a time of closure of the intake valve 32) can be considered to be equal to the pressure upstream of the intake valve 32; i.e., the intake-pipe section interior pressure Pm. Therefore, the cylinder-inflow-air flow rate mc can be considered to vary in proportion to the intake-pipe section interior pressure Pm at the time of closure of the intake valve. In view of this, the intake valve model M12 obtains the cylinder-inflow-air flow rate mc in accordance with the following Equation (10), which is a generalized mathematical formula representing the present model and on the basis of rule of thumb.

$$mc=(Ta/Tm)\cdot(c\cdot Pm-d) \tag{10}$$

In Equation (10), a value c represents a proportionality coefficient; and a value d represents a value reflecting the amount of burned gas having remained within the cylinder. The value c is obtained on the base of a table MAPC which defines a relation between the engine speed NE and open-close timing VT of the intake valve 32 and the value c; the engine speed NE; and the open-close timing VT of the intake valve 32. The table MAPC used in the intake valve model M12 is stored in the ROM 72. Similarly, the value d is obtained on the base of a table MAPD which defines a relation between the engine speed NE and the open-close timing VT of the intake valve 32 and the constant d; the engine speed NE; and the open-close timing VT of the intake valve 32. The table MAPD used in the intake valve model M12 is stored in the ROM 72.

The intake valve model M12 estimates the cylinder-inflow-air flow rate mc by use of Equation (10), the table MAPC and the table MAPD. More specifically, the intake valve model M12 obtains the value c from the table MAPC, the engine speed NE at the present time point and the open-close timing VT of the intake valve 32 at the present time point (c=MAPC (NE, VT)). Further, the intake valve model M12 obtains the value d from the table MAPD, the engine speed NE at the present time point and the open-close timing VT of the intake valve 32 at the present time point (d=MAPD(NE, VT)).

The intake valve model M12 applies to Equation (10) the intake-pipe section interior pressure Pm1(k−1) and intake-pipe section interior temperature Tm1(k−1), which were estimated at the time of the (k−1)-th time estimation by the intake pipe model M15 to be described later; the intake-air temperature Ta at the present time point; and the obtained value c and value d, whereby the cylinder-inflow-air flow rate mc1(k−1) is obtained.

(First Compressor Model M13)

The first compressor model M13 estimates a rotational speed (compressor rotational speed) Ncm of the compressor 91*a* and a compressor applied energy Ecm which is an energy per unit time which the compressor 91*a* of the turbocharger 91 imparts to air to be supplied to the intercooler section when the air passes through the compressor 91*a*, on the basis of the intercooler section interior pressure Pic, the compressor-inflow-air flow rate mcmi and etc.

Figure 7:
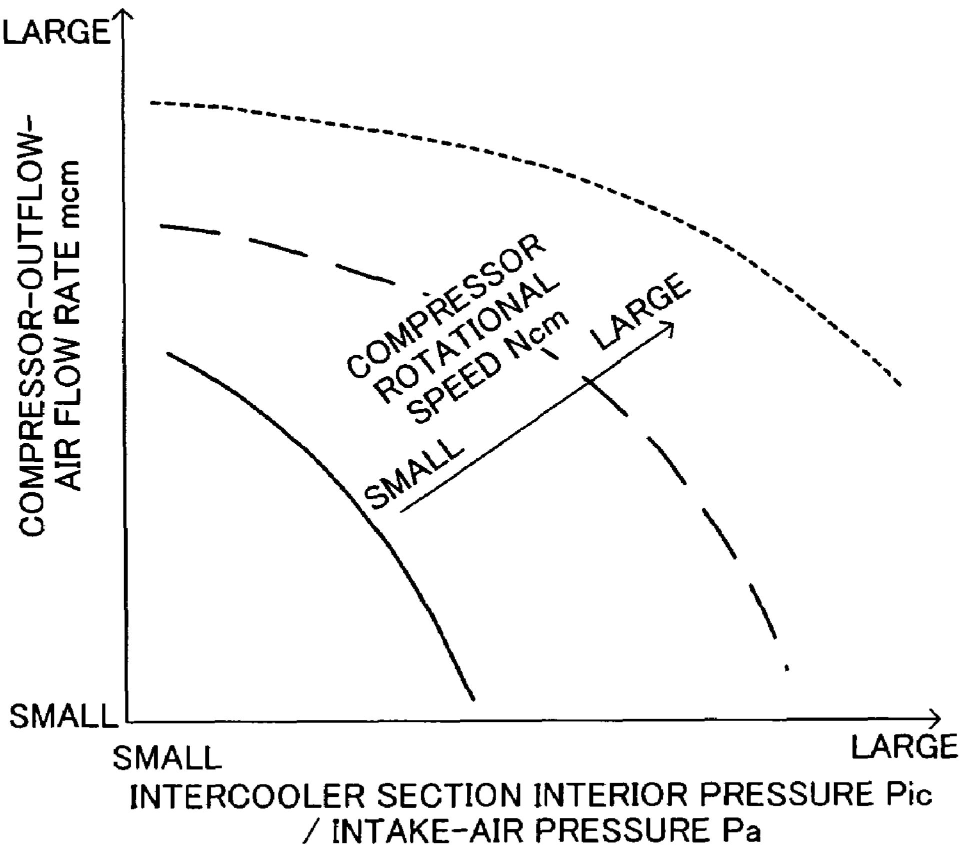
FIG. 7 is a table specifying a relation among a compressor-outflow-air flow rate, a value obtained by dividing an inter-cooler section interior pressure by an intake-air pressure and a compressor rotational speed, the table being referenced by a CPU shown in FIG. 1.

First, the compressor rotational speed Ncm estimated by the present model will be described. It is empirically known that the compressor rotational speed Ncm can be obtained on the basis of the compressor-outflow-air flow rate mcm and a value Pic/Pa obtained by dividing the intercooler section interior pressure Pic by the intake-air pressure Pa. Accordingly, the compressor rotational speed Ncm is obtained on the basis of a table MAPCM, which was previously obtained through experiments, defining a relation (compressor operation condition relation) among the compressor-outflow-air flow rate mcm, the value Pic/Pa (obtained by dividing the intercooler section interior pressure Pic by the intake-air pressure Pa) and the compressor rotational speed Ncm; the value Pic/Pa (obtained by dividing the intercooler section interior pressure Pic by the intake-air pressure Pa); and the compressor-outflow-air flow rate mcm. FIG. 7 shows the table MAPCM, which is stored in the ROM 72, being used by the first compressor model M13. Notably, the ROM 72, which stores the table MAPCM, constitutes the compressor-operation-condition-relation storage means.

The first compressor model M13 estimates the compressor rotational speed Ncm by use of the table MAPCM. More specifically, the first compressor model M13 estimates the compressor rotational speed Ncm(k−1) (=MAPCM(mcm1(k−1), Pic1(k−1)/Pa)) at the present time point from the table MAPCM; the actual compressor-inflow-air flow rate mcmi (k−1) at the present time point, which is estimated by the AFM inverse model M1, being employed as a compressor-outflow-air flow rate mcm1(k−1) at the present time point; and the value Pic1(k−1)/Pa obtained by dividing the intercooler section interior pressure Pic1(k−1) which was estimated at the time of the (k−1)-th time estimation by the intercooler model M14 to be described later, by the intake-air pressure Pa at the present time point.

Notably, the first compressor model M13 may use a table MAPCMSTD stored in the ROM 72 instead of the table MAPCM. The table MAPCMSTD defines a relation among a compressor-outflow-air flow rate (standard-state compressor-outflow-air flow rate) mcmstd in a standard state, a value Picstd/Pstd obtained by dividing an intercooler section interior pressure Picstd in the standard state by a standard pressure Pstd and a compressor rotational speed (standard-state compressor rotational speed) Ncmstd in the standard state. Here, the standard state is a state in which a pressure of compressor inflow air which is air flowing into the compressor 91*a* is a standard pressure Pstd (e.g., 96276 Pa) and a temperature of the compressor inflow air is a standard temperature Tstd (e.g., 303.02K).

In this case, the first compressor model M13 obtains the above-described standard-state compressor rotational speed Ncmstd on the basis of the standard-state compressor-outflow-air flow rate mcmstd obtained by applying the compressor-outflow-air flow rate mcm to the right side of the following Equation (11), the value Pic/Pa which is obtained by dividing the intercooler section interior pressure Pic by the intake-air pressure Pa and the above-described table MAPCMSTD; and applies the obtained standard-state compressor rotational speed Ncmstd to the right side of the following Equation (12) to thereby obtain the compressor rotational speed Ncm in a state in which the pressure of the compressor inflow air is equal to the intake-air pressure Pa and the temperature of the compressor inflow air is equal to the intake-air temperature Ta.

$$mcmstd = mcm \cdot \frac{\sqrt{\frac{Ta}{Tstd}}}{\frac{Pa}{Pstd}} \tag{11}$$

$$Ncm = Ncmstd \cdot \sqrt{\frac{Ta}{Tstd}} \tag{12}$$

Next, the compressor applied energy Ecm estimated by the present model will be described. The compressor applied energy Ecm is obtained from the following Equation (13), which is a generalized mathematical formula representing a part of the present model and based on the law of conservation of energy; the compressor efficiency η; the compressor-outflow-air flow rate mcm, the value Pic/Pa which is obtained by dividing the intercooler section interior pressure Pic by the intake-air pressure Pa; and the intake-air temperature Ta.

$$Ecm = Cp \cdot mcm \cdot Ta\left(\left(\frac{Pic}{Pa}\right)^{\frac{\kappa-1}{\kappa}} - 1\right)\frac{1}{\eta} \tag{13}$$

Figure 8:
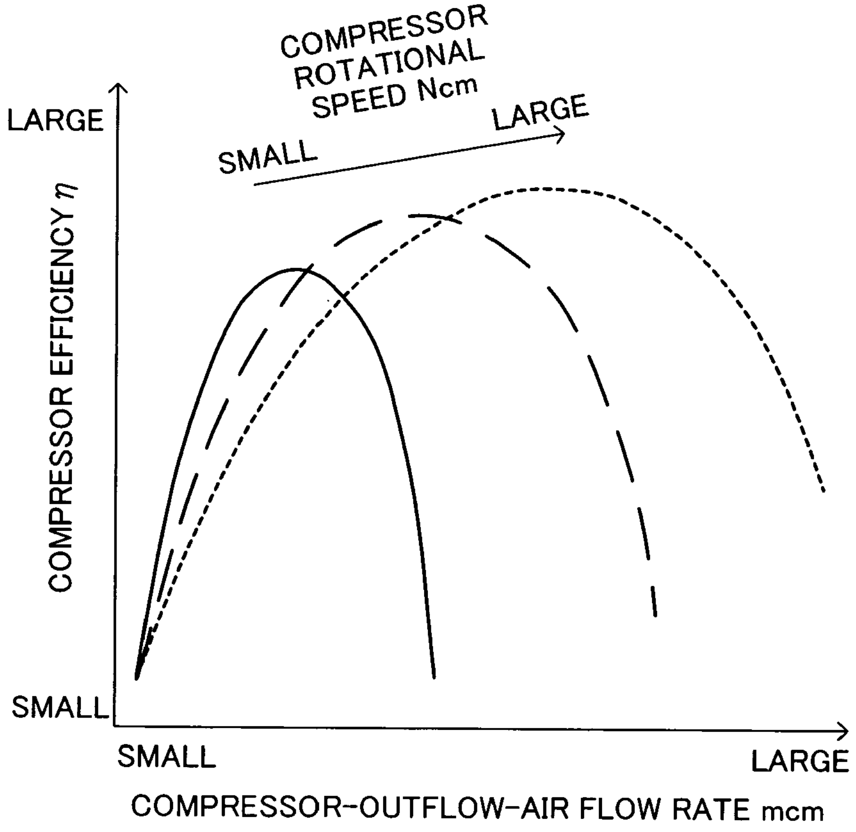
FIG. 8 is a table specifying a relation among a compressor-outflow-air flow rate, a compressor rotational speed and a compressor efficiency, the table being referenced by the CPU shown in FIG. 1.

Here, Cp represents the specific heat of air at constant pressure. Further, it is empirically known that the compressor efficiency η can be estimated on the basis of the compressor-outflow-air flow rate mcm and the compressor rotational speed Ncm. Accordingly, the compressor efficiency η is obtained on the basis of a table MAPETA, which is previously obtained through experiments, defining a relation among the compressor-outflow-air flow rate mcm, the compressor rotational speed Ncm and the compressor efficiency η; the compressor-outflow-air flow rate mcm; and the compressor rotational speed Ncm. In view of this, the first compressor model M13 uses the table MAPETA, which is shown in FIG. 8 and is stored in the ROM 72.

The first compressor model M13 estimates the compressor applied energy Ecm by use of the above-described Equation (13) and the above-described table MAPETA. More specifically, the first compressor model M13 estimates a compressor efficiency η1(k−1) (=MAPETA(mcm1(k−1), Ncm(k−1)) on the basis of the actual compressor-inflow-air flow rate mcmi (k−1) at the present time point, which was estimated by the AFM inverse model M1, being employed as a compressor-outflow-air flow rate mcm1(k−1) at the present time point, the estimated compressor rotational speed Ncm (k−1) at the present time point and the table MAPETA.

Subsequently, the first compressor model M13 applies to the above-described Equation (13) the estimated compressor efficiency η1(k−1); the compressor-outflow-air flow rate mcm1(k−1) at the present time point; the value Pic1(k−1)/Pa obtained by dividing the intercooler section interior pressure Pic1(k−1) which was estimated at the time of the (k−1)-th time estimation by the intercooler model M14 to be described later, by the intake-air pressure Pa at the present time point; and the intake-air temperature Ta at the present time point, whereby the compressor applied energy Ecm1(k−1) is estimated.

Here, a process of deriving the above-described Equation (13), which partially describes the first compressor model M13, will be described. In the following description, all the energy applied to air during a period between entering the compressor 91*a* and leaving the compressor 91*a* is assumed to contribute to an increase in temperature (that is, kinetic energy is ignored).

When the flow rate of compressor, inflow air which is air flowing into the compressor 91*a* is represented by mi, the temperature of the compressor inflow air is represented by Ti, the flow rate of compressor outflow air which is air flowing out of the compressor 91*a* is represented by mo and the temperature of the compressor outflow air is represented by To, the energy of the compressor inflow air is represented by Cp·mi·Ti and the energy of the compressor outflow air is represented by Cp·mo·To. Since the sum of the energy of the compressor inflow air and the compressor applied energy Ecm is equal to the energy of the compressor outflow air, the following Equation (14) based on the law of conservation of energy is obtained.

$$Cp \cdot mi \cdot Ti + Ecm = Cp \cdot mo \cdot To \tag{14}$$

Incidentally, since the flow rate mi of the compressor inflow air can be considered to be equal to the flow rate mo of the compressor outflow air, the following Equation (15) is obtained from Equation (14).

$$Ecm = Cp \cdot mo \cdot (To - Ti) \tag{15}$$

Meanwhile, the compressor efficiency η is defined by the following Equation (16).

$$\eta = \frac{Ti\left(\left(\frac{Po}{Pi}\right)^{\frac{\kappa-1}{\kappa}} - 1\right)}{To - Ti} \tag{16}$$

Here, Pi represents the pressure of the compressor inflow air, and Po represents the pressure of the compressor outflow air. When Equation (16) is substituted for (To−Ti) in Equation (15) so as to eliminate (To−Ti), the following Equation (17) is obtained.

$$Ecm = Cp \cdot mo \cdot Ti\left(\left(\frac{Po}{Pi}\right)^{\frac{\kappa-1}{\kappa}} - 1\right)\frac{1}{\eta} \tag{17}$$

The pressure Pi and temperature Ti of the compressor inflow air can be considered to be equal to the intake-air pressure Pa and the intake-air temperature Ta, respectively. Further, since pressure propagates more easily than temperature does, the pressure Po of the compressor outflow air can be considered to be equal to the intercooler section interior pressure Pic. Moreover, the flow rate mo of the compressor outflow air is the compressor-outflow-air flow rate mcm. When these factors are taken into consideration, the above-described Equation (13) can be obtained from Equation (17).

(Intercooler Model M14)

The intercooler model M14 obtains the intercooler section interior pressure Pic and the intercooler section interior temperature Tic on the basis of the following Equations (18) and (19), which are generalized mathematical formulas representing the present model and based on the law of conservation of mass and the law of conservation of energy regarding air within the intercooler section; the intake-air temperature Ta; the flow rate of air flowing into the intercooler section (that is, compressor-outflow-air flow rate) mcm; the compressor applied energy Ecm; and the flow rate of air flowing out of the intercooler section (that is, throttle-passing-air flow rate) mt. Notably, in the following Equations (18) and (19), Vic represents the volume of the intercooler section.

$$d(Pic/Tic)/dt=(R/Vic)\cdot(mcm-mt) \quad (18)$$

$$dPic/dt=\kappa\cdot(R/Vic)\cdot(mcm\cdot Ta-mt\cdot Tic)+(\kappa-1)/(Vic)\cdot(Ecm-K\cdot(Tic-Ta)) \quad (19)$$

The intercooler model M14 estimates the intercooler section interior pressure Pic and the intercooler section interior temperature Tic by use of the following Equations (20) and (21), which are obtained by discretizing Equations (18) and (19) by means of the difference method. Here, Δt is a time equal to the computation period of the present model.

$$(Pic/Tic)(k) = (Pic/Tic)(k-1)+\Delta t\cdot(R/Vic)\cdot(mcm(k-1)-mt(k-1)) \quad (20)$$

$$Pic(k) = Pic(k-1) + \Delta t\cdot\kappa\cdot(R/Vic)\cdot(mcm(k-1)\cdot Ta-mt(k-1)\cdot Tic(k-1)) + \Delta t\cdot(\kappa-1)/(Vic)\cdot(Ecm(k-1)-K\cdot(Tic(k-1)-Ta)) \quad (21)$$

More specifically, the intercooler model M14 estimates the latest intercooler section interior pressure Pic1(k) and the intercooler section interior temperature Tic1(k) on the basis of Equations (20) and (21); the actual compressor-inflow-air flow rate mcmi(k−1) at the present time point, which is estimated by the AFM inverse model M1, being employed as the compressor-outflow-air flow rate mcm1(k−1) at the present time point; the compressor applied energy Ecm1(k−1) obtained by the first compressor model M13; the throttle-passing-air flow rate mt1(k−1) obtained by the throttle model M11; the intake-air temperature Ta at the present time point; and the intercooler section interior pressure Pic1(k−1) and the intercooler section interior temperature Tic1(k−1) estimated at the time of the (k−1)-th time estimation by the present model. Notably, when estimation of the intercooler section interior pressure Pic1 and the intercooler section interior temperature Tic1 has never been performed (when the first-time estimation is performed by the present model (in the present example, when the internal combustion engine is started)), the intercooler model M14 employs the intake-air pressure Pa and the intake-air temperature Ta as the intercooler section interior pressure Pic1(0) and the intercooler section interior temperature Tic1(0), respectively.

Here, a process of deriving the above-described Equations (18) and (19) describing the intercooler model M14 will be described. First, Equation (18) based on the law of conservation of mass regarding air within the intercooler section will be studied. When the total quantity of air within the intercooler section is represented by M, the amount of change per unit time (temporal variation) of the total air quantity M is equal to the difference between the compressor-outflow-air flow rate mcm corresponding to the flow rate of air flowing into the intercooler section and the throttle-passing-air flow rate mt corresponding to the flow rate of air flowing out of the intercooler section. Therefore, the following Equation (22) based on the law of conservation of mass is obtained.

$$dM/dt=mcm-mt \quad (22)$$

Further, under the assumption that the pressure and temperature of air within the intercooler section are spatially uniform, the following Equation (23) based on the equation of state is obtained. When Equation (23) is substituted for M in Equation (22) so as to eliminate M and the fact that the volume Vic of the intercooler section does not vary is taken into consideration, the above-described Equation (18) is obtained.

$$Pic\cdot Vic=M\cdot R\cdot Tic \quad (23)$$

Next, Equation (19) based on the law of conservation of energy regarding air within the intercooler section will be studied. The amount of change per unit time (d(M·Cv·Tic)/dt) of the energy M·Cv·Tic (Cv is the specific heat of air at constant volume) of air within the intercooler section is equal to the difference between energy given to air within the intercooler section per unit time and energy removed from air within the intercooler section per unit time. In the following description, all the energy of air within the intercooler section is assumed to contribute to an increase in temperature (that is, kinetic energy is ignored).

The energy given to air within the intercooler section is the energy of air flowing into the intercooler section. This energy of air flowing into the intercooler section is equal to the sum of the energy Cp·mcm·Ta of air which flows into the intercooler section while maintaining the intake-air temperature Ta under the assumption that air is not compressed by the compressor 91*a* and the compressor applied energy Ecm which is the energy applied to the air flowing into the intercooler section by the compressor 91*a* of the turbocharger 91.

Meanwhile, the energy removed from air within the intercooler section is equal to the sum of the energy Cp·mt·Tic of air which flows out of the intercooler section and heat exchange energy which is the energy exchanged between air within the intercooler 45 and the wall of the intercooler 45.

This heat exchange energy is obtained in accordance with an equation based on a general rule of thumb as a value K·(Tic−Ticw) which is in proportion to the difference between a temperature Tic of air within the intercooler 45 and a temperature Ticw of the wall of the intercooler 45. Here, K represents a value corresponding to the product of the surface area of the intercooler 45 and the heat transfer coefficient between the air within the intercooler 45 and the wall of the intercooler 45. Incidentally, since the inter cooler 45 is adapted to cool air within the intake passage by means of air outside the engine 10 as described above, the temperature Ticw of the wall of the intercooler 45 is generally equal to the temperature of air outside the engine 10. Accordingly, the temperature Ticw of the wall of the intercooler 45 can be considered to be equal to the intake-air temperature Ta. Therefore, the above-mentioned heat exchange energy can be obtained as a value K·(Tic−Ta).

Thus, the following Equation (24) based on the law of conservation of energy regarding air within the intercooler section can be obtained.

$$d(M\cdot Cv\cdot Tic)/dt=Cp\cdot mcm\cdot Ta-Cp\cdot mt\cdot Tic+Ecm-K\cdot(Tic-Ta) \quad (24)$$

Incidentally, the specific heat ratio K is represented by the following Equation (25), and the Mayer relation is represented by the following Equation (26). Therefore, the above-described Equation (19) can be obtained by transforming Equation (24) by use of the above-described Equation (23) (Pic·Vic=M·R·Tic) and the following Equations (25) and (26). Here, the transformation is performed by taking into consideration the fact that the volume Vic of the intercooler section does not vary.

$$\kappa = Cp/Cv \tag{25}$$

$$Cp = Cv + R \tag{26}$$

(Intake Pipe Model M15)

The intake pipe model M15 obtains the intake-pipe section interior pressure (that is, throttle valve downstream pressure) Pm and the intake-pipe section interior temperature (that is, throttle valve downstream temperature) Tm on the basis of the following Equations (27) and (28), which are generalized mathematical formulas representing the present model and based on the law of conservation of mass and the law of conservation of energy regarding air within the intake-pipe section; the flow rate of air flowing into the intake-pipe section (that is, throttle-passing-air flow rate) mt; the intercooler section interior temperature Tic; and the flow rate of air flowing out of the intake-pipe section (that is, cylinder-inflow-air flow rate) mc. In Equations (27) and (28), Vm represents the volume of the intake-pipe section (the intake passage extending from the throttle valve 46 to the intake valve 32).

$$d(Pm/Tm)/dt = (R/Vm)\cdot(mt - mc) \tag{27}$$

$$dPm/dt = \kappa\cdot(R/Vm)\cdot(mt\cdot Tic - mc\cdot Tm) \tag{28}$$

The intake pipe model M15 estimates the intake-pipe section interior pressure Pm and the intake-pipe section interior temperature Tm by use of the following Equations (29) and (30), which are obtained by discretizing Equations (27) and (28) by means of the difference method. Here, Δt is a time equal to the computation period of the present model.

$$(Pm/Tm)(k) = (Pm/Tm)(k-1) + \Delta t\cdot(R/Vm)\cdot(mt(k-1) - mc(k-1)) \tag{29}$$

$$Pm(k) = Pm(k-1) + \Delta t\cdot\kappa\cdot(R/Vm)\cdot(mt(k-1)\cdot Tic(k-1) - mc(k-1)\cdot Tm(k-1)) \tag{30}$$

More specifically, the intake pipe model M15 estimates the latest intake-pipe section interior pressure Pm1(k) and the latest intake-pipe section interior temperature Tm1(k) on the basis of Equations (29) and (30); the throttle-passing-air flow rate mt1(k−1) obtained by the throttle model M11; the cylinder-inflow-air flow rate mc1(k−1) obtained by the intake valve model M12; the intercooler section interior temperature Tic1(k−1) estimated at the time of the (k−1)-th time estimation by the intercooler model M14; and the intake-pipe section interior pressure Pm1(k−1) and intake-pipe section interior temperature Tm1(k−1) estimated at the time of the (k−1)-th time estimation by the present model. Notably, when estimation of the intake-pipe section interior pressure Pm1 and intake-pipe section interior temperature Tm1 has never been performed (when the first-time estimation is performed by the present model (in the present example, when the internal combustion engine is started)), the intake pipe model M15 employs the intake-air pressure Pa and the intake-air temperature Ta as the intake-pipe section interior pressure Pm1(0) and the intake-pipe section interior temperature Tm1(0), respectively.

As described above, the first air model M10 estimates the compressor rotational speed Ncm at the present time point on the basis of the actual compressor-inflow-air flow rate mcmi at the present time point estimated by the AFM inverse model M1 and the actual throttle valve opening θta calculated by the throttle-valve-opening calculation means M2.

<Electronic Control Throttle Valve Model M3 and Electronic Control Throttle Valve Logic A1>

Next, there will be described the electronic control throttle valve logic A1 for controlling the throttle valve opening and the electronic control throttle valve model M3 for estimating the throttle valve opening at a future time point after the present time point. The electronic control throttle valve model M3 cooperates with the electronic control throttle valve logic A1 so as to estimate the throttle valve opening θt at time points up to a time point (throttle-valve-opening foreseeable time point) which is later than the present time point by a predetermined delay time TD (in the present example, 64 ms), on the basis of the accelerator pedal operation amount Accp at time points up to the present time point.

Figure 9:
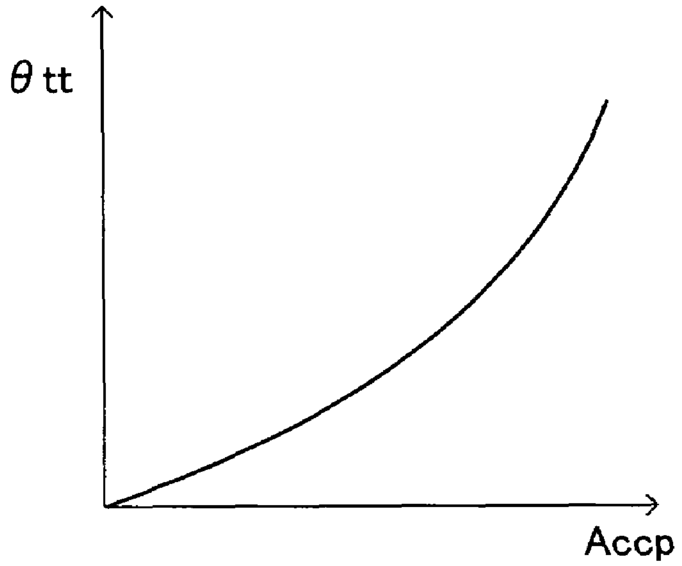
FIG. 9 is a table specifying a relation between an accelerator pedal operation amount and a target throttle valve opening, the table being referenced by the CPU shown in FIG. 1.
Figure 10:
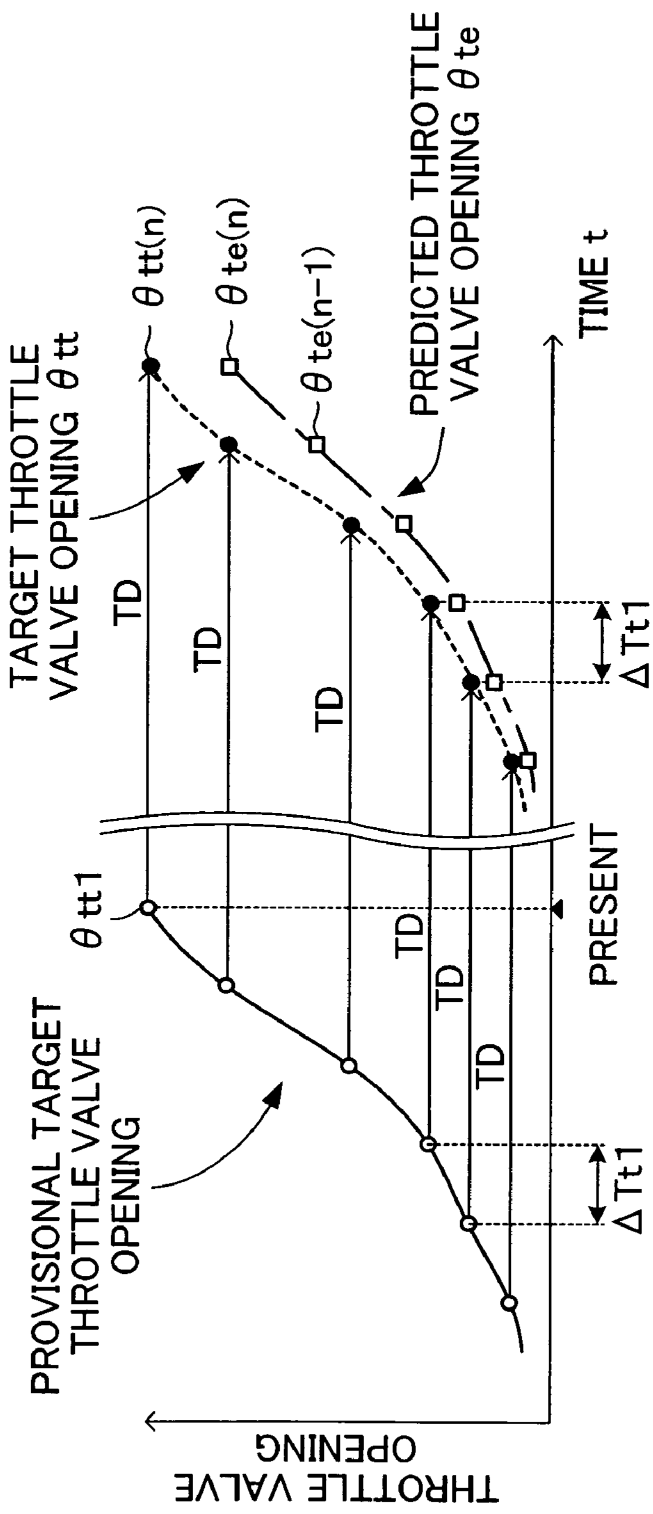
FIG. 10 is a time chart showing changes in a provisional target throttle valve opening, a target throttle valve opening, a predicted throttle valve opening.

Specifically, every time a predetermined time ΔTt1 (in the present example, 2 ms) elapses, the electronic control throttle valve logic A1 determines a provisional target throttle valve opening θtt1 on the basis of a table of FIG. 9, which defines a relation between the accelerator pedal operation amount Accp and the target throttle valve opening θtt, and the actual accelerator pedal operation amount Accp detected by the accelerator opening sensor 67. Further, as shown in FIG. 10, which is a time chart, the electronic control throttle valve logic A1 stores the provisional target throttle valve opening θtt1 as the target throttle valve opening θtt at the throttle-valve-opening foreseeable time point. That is, the electronic control throttle valve logic A1 sets, as the target throttle valve opening θtt at the present time point, the provisional target throttle valve opening θtt1 determined at a time point which is earlier than the present time point by the predetermined delay time TD. Subsequently, the electronic control throttle valve logic A1 outputs a drive signal to the throttle valve actuator 46*a* such that the throttle valve opening θta at the present time point coincides with the target throttle valve opening Off at the present time point.

Incidentally, when the drive signal is supplied from the electronic control throttle valve logic A1 to the throttle valve actuator 46*a*, the actual throttle valve opening θta follows the target throttle valve opening θtt with some delay due to a delay in actuation of the throttle valve actuator 46*a*, the inertia of the throttle valve 46, or the like. In view of this, the electronic control throttle valve model M3 estimates (predicts) the throttle valve opening at a time point which is later than the present time point by a predetermined delay time TD, on the basis of the following Equation (31) (see FIG. 10).

$$\theta te(n) = \theta te(n-1) + \Delta Tt1\cdot g(\theta tt(n), \theta te(n-1)) \tag{31}$$

Figure 11:
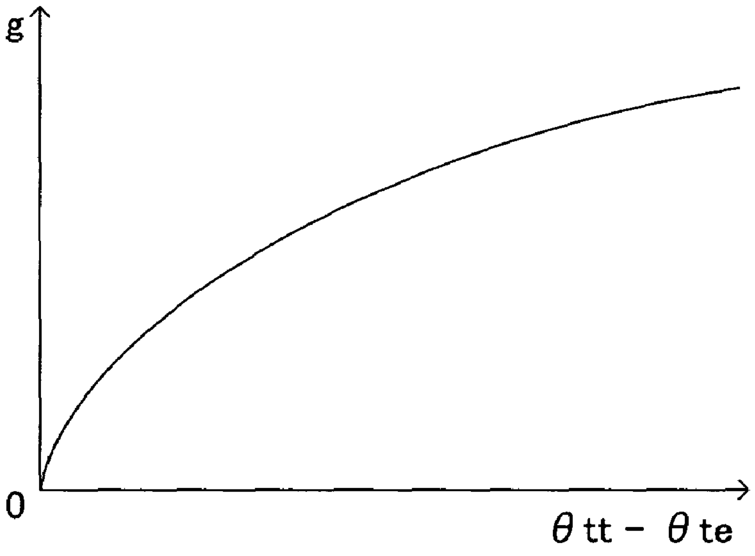
FIG. 11 is a graph showing a function used for calculation of the predicted throttle valve opening.

In Equation (31), θte(n) is a predicted throttle valve opening θte newly estimated at the present computation time, θtt(n) is a target throttle valve opening θtt newly set at the present computation time and θte(n−1) is the predicted throttle valve opening θte having already been estimated before the present computation time (that is, the predicted throttle valve opening θte newly estimated at the previous computation time). Further, as shown in FIG. 11, the function g(θtt, θte) is a function which provides a value increasing with the difference Δθt (=θtt−θte) between θtt and θte (a function g monotonously increasing with Δθt).

As described above, the electronic control throttle valve model M3 newly determines, at the present computation time, the target throttle valve opening θtt at the above-mentioned throttle-valve-opening foreseeable time point (a time point which is later than the present time point by the predetermined delay time TD); newly estimates the throttle valve opening θte at the throttle-valve-opening foreseeable time point; and memorizes (stores) the target throttle valve opening θtt and the predicted throttle valve opening θte at time points up to the throttle-valve-opening foreseeable time point in the RAM 73 while relating them to elapse of time from the present point in time. Notably, in the case where the actual throttle valve opening θta coincides with the target throttle valve opening θtt with a negligible delay after the drive signal is supplied to the throttle valve actuator 46*a*, the throttle valve opening may be estimated by use of the equation (θte(n)=θtt(n)) in place of the above-described Equation (31).

<Second Air Model M20>

Figure 12:
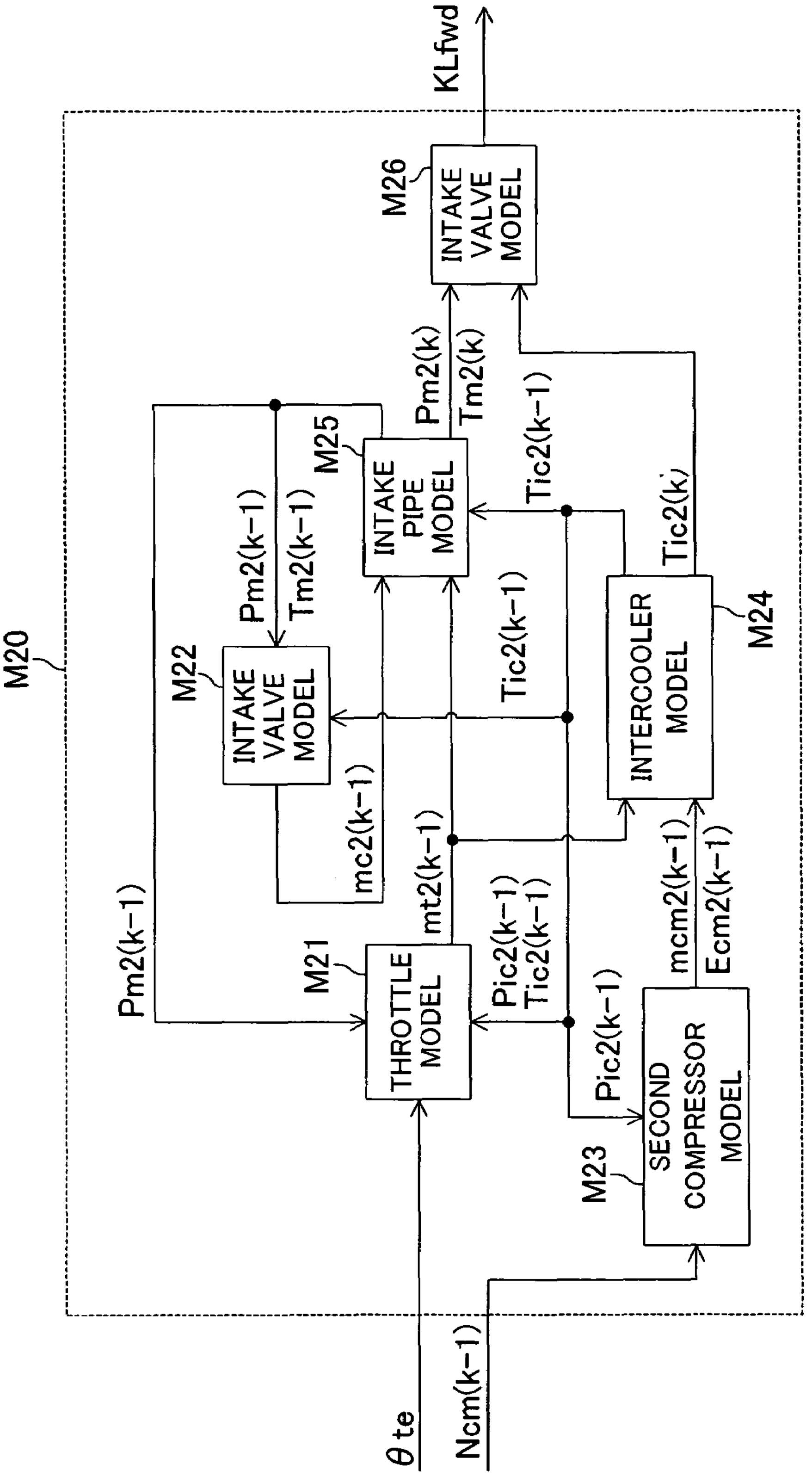
FIG. 12 is a detailed functional block diagram of a second air model shown in FIG. 4.

The second air model M20 estimates a cylinder-interior air quantity KLfwd at a future time point later than the present time point on the basis of the throttle valve opening θte at the future time point estimated by the electronic control throttle valve model M3 and the compressor rotational speed Ncm at the present time point estimated by the first air model M10. As shown in FIG. 12, the second air model M20 is an air model similar to the first air model M10 (see FIG. 6) which models the behavior of air within the intake passage downstream of the compressor 91*a* in the engine 10 equipped with the turbocharger 91. The second air model M20 includes a throttle model M21, an intake valve model M22, a second compressor model M23, an intercooler model M24, an intake pipe model M25 and an intake valve model M26.

Unlike the first air model M10, which estimates physical quantities at the present time point (physical quantities as measured at the present time point), the second air model M20 estimates physical quantities at a future time point (physical quantities as measured at a future time point). Accordingly, as will be described later, the throttle valve opening θt, the compressor rotational speed Ncm, the intake-air pressure Pa, the intake-air temperature Ta, the engine speed NE, the open-close timing VT of the intake valve 32, etc. which are applied to the models M21 to M26 must be those at the future time point after the present time point.

Therefore, the second air model M20 uses the throttle valve opening θte at the future time point after the present time point estimated by the electronic control throttle valve model M3. The compressor rotational speed Ncm does not vary greatly within a short time between the present time point and the future time point for which the cylinder-interior air quantity KLfwd is estimated. Therefore, the second air model M20 employs the compressor rotational speed Ncm at the present time point estimated by the first air model M10 as the compressor rotational speed Ncm at the future time point.

Further, the intake-air pressure Pa, the intake-air temperature Ta, the engine speed NE and the open-close timing VT of the intake valve 32 do not vary greatly within the short time between the present time point and the future time point for which the cylinder-interior air quantity KLfwd is estimated. Accordingly, the second air model M20 employs the intake-air pressure Pa, the intake-air temperature Ta, the engine speed NE and the open-close timing VT of the intake valve 32 at the present time point as the intake-air pressure Pa, the intake-air temperature Ta, the engine speed NE and the open-close timing VT of the intake valve 32 at the future time point, respectively.

As described above, the second air model M20 estimates the cylinder-interior air quantity KLfwd at the future time point by use of the models M21 to M26 on the basis of the estimated throttle valve opening θte at the future time point, the estimated compressor rotational speed Ncm at the present time point, the intake-air pressure Pa at the present time point, the intake-air temperature Ta at the present time point, the engine speed NE at the present time point and the open-close timing VT of the intake valve 32 at the present time point.

Notably, as will be described later, as in the case of the first air model M10, some generalized mathematical formulas that represent the models M21 to M26 of the second air model M20 include time-differential terms regarding the pressure Pic and temperature Tic of air within the intercooler section and the pressure Pm and temperature Tm of air within the intake pipe section. In the second air model M20, as in the case of the first air model M10, the mathematical formulas including the time-differential terms are discretized; and, on the basis of the discretized mathematical formulas and a physical quantity at a first time point which is later than the present time point (previous estimation time t1 to be described later), a physical quantity at a second time point which is later than the first time point by a predetermined minute time (present estimation time t2 to be described later) is estimated.

By repeating such estimation, the second air model M20 estimates the physical quantity at further future time points. That is, the second air model M20 successively estimates the physical quantity at each period (interval) of the minute time by repeatedly estimating the physical quantity. In the following description, a variable to which (k−1) is added representing a physical quantity is a variable representing the physical quantity estimated at the time of the (k−1)-th time estimation (at the time of previous computation). Further, a variable to which k is added representing a physical quantity is a variable representing the physical quantity estimated at the time of the k-th time estimation (at the time of present computation).

The individual models shown in FIG. 12 will now be described specifically. Notably, the throttle model M21, the intake valve model M22, the intercooler model M24 and the intake pipe model M25 are similar to the throttle model M11, the intake valve model M12, the intercooler model M14 and the intake pipe model M15, respectively, of the first air model M10 shown in FIG. 6. Accordingly, for these models, the points different from the corresponding models of the first air model M10 will be mainly described.

(Throttle Model M21)

Like the throttle model M11, the throttle model M21 estimates the throttle-passing-air flow rate mt by use of the above-described Equations (8), (9-1) and (9-2), the above-described table MAPCTAT and the above-described table MAPΦ. More specifically, the throttle model M21 obtains a value Ct2(θte)·At2(θte) (=MAPCTAT(θte)) on the basis of the table MAPCTAT and the throttle valve opening θte at the future time point estimated by the electronic control throttle valve model M3.

Moreover, the throttle model M21 obtains a value Φ2(Pm2(k−1)/Pic2(k−1)) (=MAPΦ(Pm2(k−1)/Pic2(k−1)) on the basis of the above-described table MAPΦ and the value Pm2(k−1)/Pic2(k−1) which is obtained by dividing the intake-pipe section interior pressure Pm2(k−1) which was estimated at the time of the (k−1)-th time estimation by the intake pipe model M25 to be described later, by the intercooler section interior pressure Pic2(k−1) which was estimated at the time of the (k−1)-th time estimation by the intercooler model M24 to be described later.

The throttle model M21 applies to the above-described Equation (8) the value Ct2(θte)·At2(θte) and the value Φ2(Pm2(k−1)/Pic2(k−1), which have been obtained as described above; and the intercooler section interior pressure Pic2(k−1) and intercooler section interior temperature Tic2

(k−1), which were estimated at the time of the (k−1)-th time estimation by the intercooler model M24 to be described later, whereby the throttle-passing-air flow rate mt2($k$−1) is obtained.

(Intake Valve Model M22)

Like the intake valve model M12, the intake valve model M22 estimates the cylinder-inflow-air flow rate mc by use of the above-described Equation (10), the above-described table MAPC and the above-described table MAPD. More specifically, the intake valve model M22 obtains the value c on the basis of the table MAPC, the engine speed NE at the present time point and the open-close timing VT of the intake valve 32 at the present time point (c=MAPC(NE, VT)). Further, the intake valve model M22 obtains the value d on the basis of the table MAPD, the engine speed NE at the present time point and the open-close timing VT of the intake valve 32 at the present time point (d=MAPD(NE, VT)).

The intake valve model M22 applies to the above-described Equation (10) the intake-pipe section interior pressure Pm2(k−1) and intake-pipe section interior temperature Tm2(k−1), which were estimated at the time of the (k−1)-th time estimation by the intake pipe model M25 to be described later; the intake temperature Ta at the present time point; and the obtained values c and d, whereby the cylinder-inflow-air flow rate mc2(k−1) is estimated.

(Second Compressor Model M23)

The second compressor model M23 estimates the compressor-outflow-air flow rate mcm and the compressor applied energy Ecm on the basis of the intercooler section interior pressure Pic, the compressor rotational speed Ncm, etc.

First, the compressor-outflow-air flow rate mcm estimated by the present model will be described. The compressor-outflow-air flow rate mcm is obtained on the basis of the table MAPCM used in the first compressor model M13, the value Pic/Pa obtained by dividing the intercooler section interior pressure Pic by the intake-air pressure Pa and the compressor rotational speed Ncm. As in the case of the first compressor model M13, the second compressor model M23 uses the table MAPCM stored in the ROM 72. Notably, the ROM 72, which stores the table MAPCM, constitutes the compressor-operation-condition-relation storage means.

The second compressor model M23 estimates the compressor-outflow-air flow rate mcm by use of the table MAPCM. More specifically, the second compressor model M23 estimates a compressor-outflow-air flow rate mcm2(k−1) (=MAPCM(Pic2(k−1)/Pa, Ncm (k−1))) on the basis of the table MAPCM; the value Pic2(k−1)/Pa obtained by dividing the intercooler section interior pressure Pic2(k−1) which was estimated at the time of the (k−1)-th time estimation by the intercooler model M24 to be described later, by the intake-air pressure Pa at the present time point; and the compressor rotational speed Ncm(k−1) at the present time point, which was estimated by the first compressor model M13, being employed as the compressor rotational speed Ncm(k−1) at the future time point.

Notably, as in the case of the first compressor model M13, the second compressor model M23 may use a table MAPMCMSTD stored in the ROM 72 instead of the table MAPCM. The table MAPMCMSTD defines a relation between the value Picstd/Pstd obtained by dividing intercooler section interior pressure Picstd in the standard state by the standard pressure Pstd and the compressor rotational speed Ncmstd in the standard state and the compressor-outflow-air flow rate mcmstd in the standard state.

Next, the compressor applied energy Ecm estimated by the present model will be described. As in the case of the first compressor model M13, the compressor applied energy Ecm is obtained on the basis of the above-described Equation (13), which is a generalized mathematical formula representing a part of the present model and based on the law of conservation of energy; the compressor efficiency η; the compressor-outflow-air flow rate mcm; the value Pic/Pa which is obtained by dividing the intercooler section interior pressure Pic by the intake-air pressure Pa; and the intake-air temperature Ta. Further, the compressor efficiency η is obtained on the basis of the table MAPETA used in the first compressor model M13; the compressor-outflow-air flow rate mcm; and the compressor rotational speed Ncm. As in the case of the first compressor model M13, the second compressor model M23 uses the table MAPETA stored in the ROM 72.

Like the first compressor model M13, the second compressor model M23 estimates the compressor applied energy Ecm by use of the above-described Equation (13) and the above described table MAPETA. More specifically, the second compressor model M23 estimates the compressor efficiency η2(k−1) (=MAPETA(mcm2(k−1), Ncm(k−1))) on the basis of the table MAPETA, the estimated compressor-outflow-air flow rate mcm2(k−1) and the compressor rotational speed Ncm (k−1) at the present time point, which was estimated by the first compressor model M13, being employed as the compressor rotational speed Ncm (k−1) at the future time point after the present time point.

Subsequently, the second compressor model M23 applies to the above-described Equation (13) the estimated compressor efficiency η2(k−1); the estimated compressor-outflow-air flow rate mcm2(k−1); the value Pic2(k−1)/Pa obtained by dividing the intercooler section interior pressure Pic2(k−1) which was estimated at the time of the (k−1)-th time estimation by the intercooler model M24, by the intake-air pressure Pa at the present time point; and the intake-air temperature Ta at the present time point, whereby the compressor applied energy Ecm2(k−1) is estimated.

(Intercooler Model M24)

The intercooler model M24 estimates the intercooler section interior pressure Pic and the intercooler section interior temperature Tic by use of the above-described Equations (20) and (21). More specifically, the intercooler model M24 estimates the latest intercooler section interior pressure Pic2(k) and the latest intercooler section interior temperature Tic2(k) on the basis of Equations (20) and (21); the compressor-outflow-air flow rate mcm2(k−1) and the compressor applied energy Ecm2(k−1) obtained by the second compressor model M23; the throttle-passing-air flow rate mt2(k−1) obtained by the throttle model M21; the intake-air temperature Ta at the present time point; and the intercooler section interior pressure Pic2(k−1) and the intercooler section interior temperature Tic2(k−1) estimated at the time of the (k−1)-th time estimation by the present model. Notably, when estimation of the intercooler section interior pressure Pic2 and the intercooler section interior temperature Tic2 has never been performed (when the first-time estimation is performed by the present model (in the present example, when the internal combustion engine is started)), the intercooler model M24 employs the intake-air pressure Pa and the intake-air temperature Ta as the intercooler section interior pressure Pic2(0) and the intercooler section interior temperature Tic2(0), respectively.

(Intake-Pipe Model M25)

The intake pipe model M25 estimates the intake-pipe section interior pressure Pm and the intake-pipe section interior temperature Tm by use of the above-described Equations (29) and (30). More specifically, the intake pipe model M25 estimates the latest intake-pipe section interior pressure Pm2(k) and the latest intake-pipe section interior temperature Tm2(k) on the basis of Equations (29) and (30); the throttle-passing-air flow rate mt2(k−1) obtained by the throttle model M21; the cylinder-inflow-air flow rate mc2(*k*−1) obtained by the intake valve model M22; the intercooler section interior temperature Tic2(k−1) estimated at the time of the (k−1)-th time estimation by the intercooler model M24; and the intake-pipe section interior pressure Pm2(k−1) and intake-pipe section interior temperature Tm2(k−1) estimated at the time of the (k−1)-th time estimation by the present model. Notably, when estimation of the intake-pipe section interior pressure Pm2 and intake-pipe section interior temperature Tm2 has never been performed (when the first-time estimation is performed by the present model (in the present example, when the internal combustion engine is started)), the intake pipe model M25 employs the intake-air pressure Pa and the intake-air temperature Ta as the intake-pipe section interior pressure Pm2(0) and the intake-pipe section interior temperature Tm2(0), respectively.

(Intake Valve Model M26)

The intake valve model M26 includes a model similar to the intake valve model M22. In the intake valve model M26, the latest cylinder-inflow-air flow rate mc2(k) is obtained by applying the latest intake-pipe section interior pressure Pm2(k) and intake-pipe section interior temperature Tm2(k) estimated at the time of the k-th time estimation by the intake pipe model M25 and the intake-air temperature Ta at the present time point to Equation (10) (mc=(Ta/Tm)·(c·Pm−d)), which is a generalized mathematical formula representing the present model and based on the rule of thumb. Subsequently, the intake valve model M26 multiplies the obtained cylinder-inflow-air flow rate mc2(k) by a time (intake valve open time) Tint during which the intake valve 32 is in an opened state. The intake valve open time Tint is calculated from the engine speed NE at the present time point and the open-close timing VT of the intake valve 32 at the present time point. As a result, the cylinder-interior air quantity KLfwd at the future time point after the present time point is obtained.

As described above, the second air model M20 estimates the cylinder-interior air quantity KLfwd at the future time point after the present time point on the basis of the throttle valve opening θte at the future time point estimated by the electronic control throttle valve model M3 and the compressor rotational speed Ncm at the present time point estimated by the first air model M10.

Next, the actual operation of the electric control device 70 will be described with reference to FIGS. 13 to 21.

<Estimation of Throttle Valve Opening>

Figure 13:
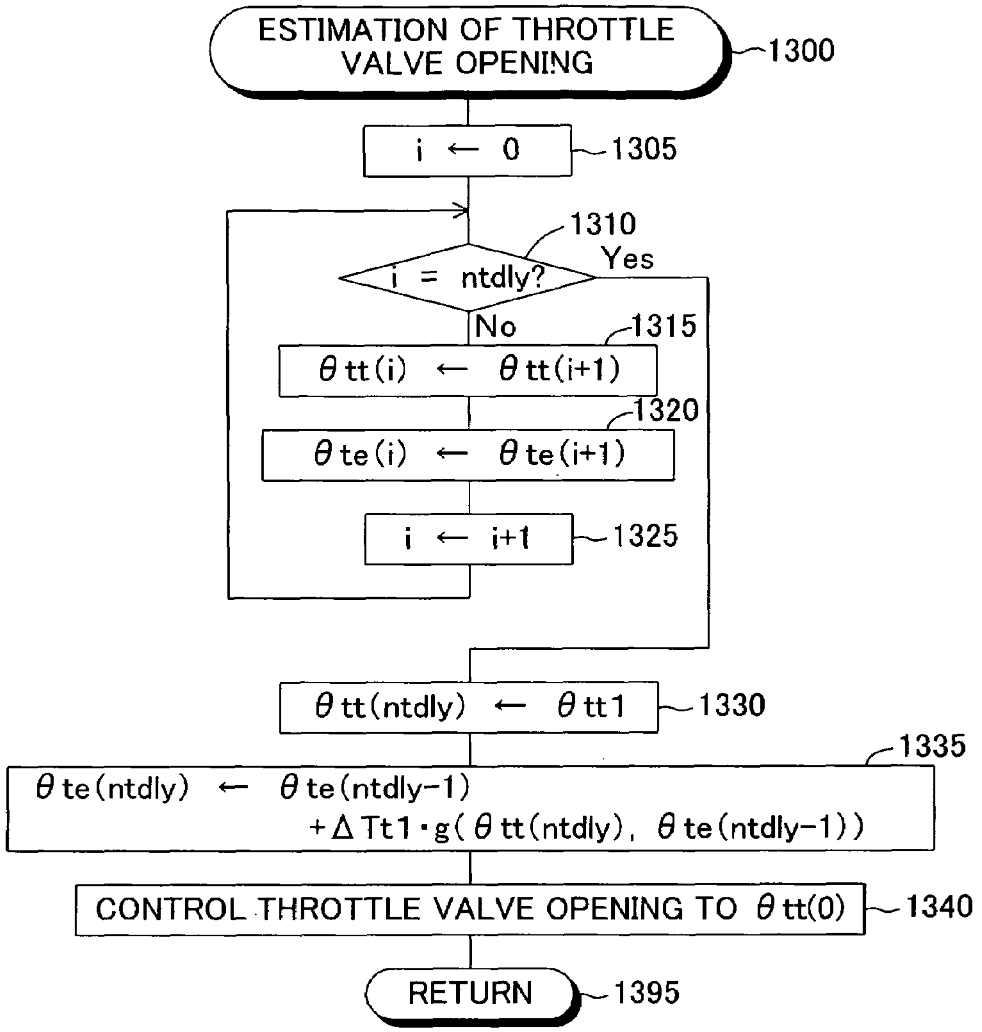
FIG. 13 is a flowchart showing a program that the CPU shown in FIG. 1 executes so as to estimate the throttle valve opening.

The CPU 71 accomplishes the functions of the electronic control throttle valve model M3 and the electronic control throttle valve logic A1 by executing a throttle-valve-opening estimation routine, shown by a flowchart in FIG. 13, every time a predetermined computation period (interval) ΔTt1 (in the present example, 2 ms) elapses. Notably, executing the throttle-valve-opening estimation routine corresponds to accomplishing the function of the throttle-valve-opening estimation means.

More specifically, the CPU 71 starts the processing from step 1300 at a predetermined timing, proceeds to step 1305 so as to set a variable i to "0" (set "0" in a memory area for a variable i), and then proceeds to step 1310 so as to determine whether the variable i is equal to a number of times of delaying ntdly. This number of times of delaying ntdly is a value (in the present example, 32) obtained by dividing the delay time TD (in the present example, 64 ms) by the above-mentioned predetermined computation period ΔTt1.

Since the value of the variable i is "0" at this point in time, the CPU 71 makes a "No" determination in step 1310 (determines that the answer in step 1310 is "No"), and proceeds to step 1315 so as to store a value of a target throttle valve opening θtt(i+1) in a memory area for a target throttle valve opening θtt(i). In step 1320 subsequent thereto, the CPU 71 stores a value of a predicted throttle valve opening θte(i+1) in a memory area for a predicted throttle valve opening θte(i). As a result of the above-described processing, the value of the target throttle valve opening θtt(1) is stored in the memory area for the target throttle valve opening θtt(0), and the value of the predicted throttle valve opening θte(1) is stored in the memory area for the predicted throttle valve opening θte(0).

Next, the CPU 71 increases the value of the variable i by "1" in step 1325, and then returns to step 1310. When the value of the variable i is smaller than the number of times of delaying ntdly, the CPU 71 executes the steps 1315 to 1325 again. That is, the steps 1315 to 1325 are repeatedly executed until the value of the variable i becomes equal to the number of times of delaying ntdly. As a result, the value of the target throttle valve opening θtt(i+1) is successively shifted to the memory area for the target throttle valve opening θtt(i), and the value of the predicted throttle valve opening θte(i+1) is successively shifted to the memory area for the predicted throttle valve opening θte(i).

When the value of the variable i becomes equal to the number of times of delaying ntdly as a result of repeated execution of the above-described step 1325, the CPU 71 makes a "Yes" determination in step 1310, and then proceeds to step 1330. In step 1330, the CPU 71 obtains a value of a provisional target throttle valve opening θtt1 for this time on the basis of an accelerator pedal operation amount Accp at the present time point and the table shown in FIG. 9, and stores it in a memory area for a target throttle valve opening θtt(ntdly) so as to use it as a target throttle valve opening θtt after elapse of the delay time TD.

Next, the CPU 71 proceeds to step 1335 and calculates a predicted throttle valve opening θte(ntdy) at a time point later than the present time point by the delay time TD, on the basis of a predicted throttle valve opening θte(ntdy−1), the target throttle valve opening θtt(ntdly) and an equation shown in the box of step 1335, which is based on the above-described Equation (31) (the right side thereof). The predicted throttle valve opening θte(ntdy−1) was stored at the time of the previous computation as a predicted throttle valve opening θte at a time point later than the time of the previous computation by the delay time TD. The target throttle valve opening θtt(ntdly) was stored in the above-described step 1330 as a target throttle valve opening θtt after elapse of the delay time TD. The CPU 71 then proceeds to step 1340, and sends a drive signal to the throttle valve actuator 46*a* such that the actual throttle valve opening θta coincides with (becomes equal to) the target throttle valve opening θtt(0). The CPU 71 then proceeds to step 1395 so as to end the current execution of the present routine.

As described above, in the memory (RAM 73) associated with the target throttle valve opening θtt, the contents (data sets) of the memory are shifted one by one every time the present routine is executed; and the value stored in the memory area for the target throttle valve opening θtt(0) is set as the target throttle valve opening θtt which is output to the throttle valve actuator 46*a* by the electronic control throttle valve logic A1. That is, the value stored in the memory area for the target throttle valve opening θtt(ntdly) as a result of current execution of the present routine is stored in the memory area for θtt(0) when the execution of the present routine have been repeated by the number of times of delaying ntdly in future (after elapse of the delay time TD). Further, in the memory associated with the predicted throttle valve opening θte, a predicted throttle valve opening θte at a time point later than the present time point by a predetermined time (m·ΔTt1) is stored in a memory area for θte(m) in the memory. The value m is an integer between 0 and ntdly.

<Calculation of Throttle Valve Opening>

Meanwhile, the CPU 71 accomplishes the function of the throttle-valve-opening calculation means M2 by executing a throttle-valve-opening calculation routine, not shown, every time a predetermined computation period ΔTt2 (in the present example, 8 ms) elapses. Specifically, every time the predetermined computation period ΔTt2 elapses, the CPU 71 obtains a voltage (output quantity) Vta which is an electrical physical quantity actually output from the throttle position sensor 64, and calculates an actual throttle valve opening θta on the basis of the obtained output quantity Vta of the throttle position sensor 64. In order to calculate the actual throttle valve opening θta by the present routine, the CPU 71 requires a predetermined throttle valve opening calculation time (in the present example, 8 ms). Accordingly, when the predetermined throttle valve opening calculation time elapses after the time point at which the output quantity Vta of the throttle position sensor 64 is output, the actual throttle valve opening θta based on the output quantity Vta is calculated.

<Calculation of Compressor Rotational Speed by the First Air Model M10>

Figure 14:
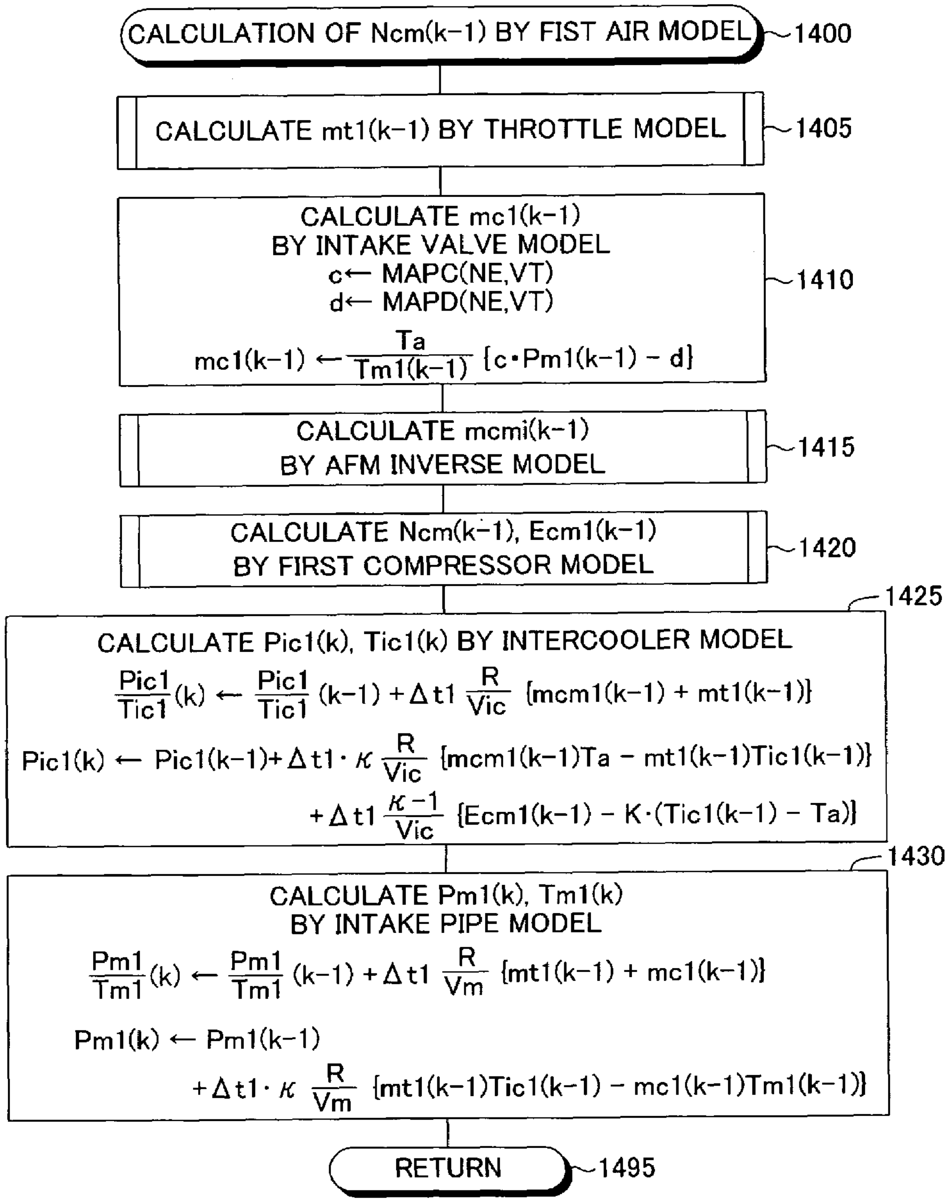
FIG. 14 is a flowchart showing a program that the CPU shown in FIG. 1 executes so as to estimate the compressor rotational speed by use of the first air model.

When the execution of the throttle-valve-opening calculation routine ends, the CPU 71 executes a routine shown by a flowchart in FIG. 14 so as to calculate the compressor rotational speed by use of the first air model M10 to thereby estimate the compressor rotational speed Ncm(k−1) at a time point at which the present routine is executed. Here, k is an integer, whose value is incremented by one every time the present routine is executed, and represents the number of times that the execution of the present routine has been started. Notably, executing processing of the individual steps of the routine of FIG. 14, excluding step 1415 to be described later, corresponds to accomplishing a portion of the function of the cylinder-interior-air-quantity estimation means.

Figure 15:
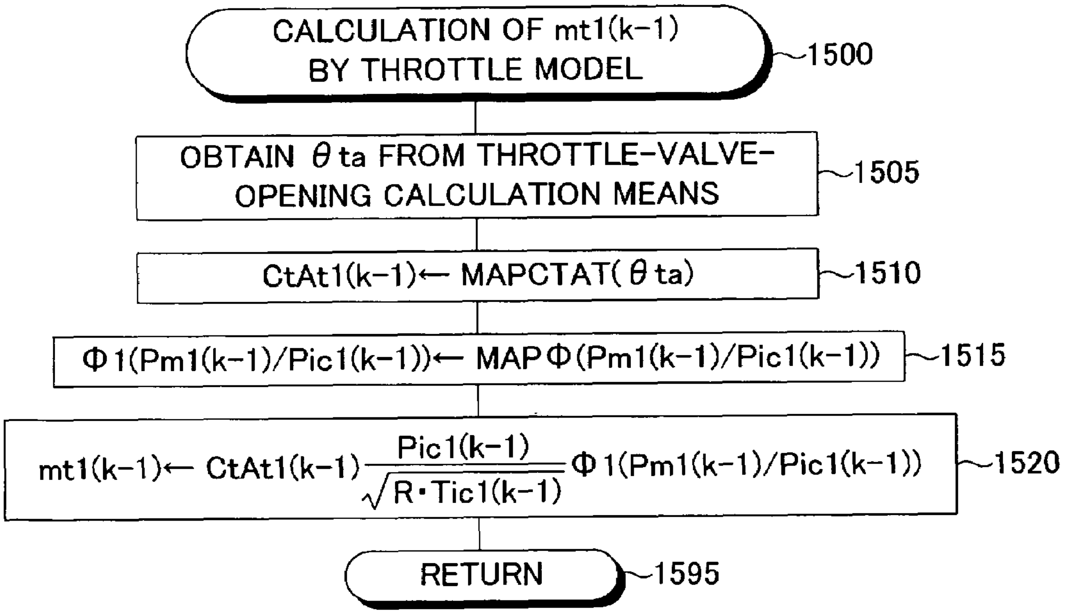
FIG. 15 is a flowchart showing a program that the CPU shown in FIG. 1 executes so as to estimate a throttle-passing-air flow rate on the basis of an actual throttle valve opening.

Specifically, at a predetermined timing, the CPU 71 starts processing from step 1400, and proceeds to step 1405, and then proceeds to step 1500 of a flowchart shown in FIG. 15 so as to obtain the throttle-passing-air flow rate mt1(k−1) by the above-described throttle model M11.

Subsequently, the CPU 71 proceeds to step 1505 so as to obtain the actual throttle valve opening θta calculated by the above-described throttle-valve-opening calculation routine.

The CPU 71 then proceeds to step 1510 so as to obtain, as a value CtAt1(k−1), the Ct(θt)·At(θt) of the above-described Equation (8) from the above-described table MAPCTAT and the actual throttle valve opening θta obtained in the step 1505.

Next, the CPU 71 proceeds to step 1515, and obtains the value Φ1(Pm1(k−1)/Pic1(k−1)) from the above-described table MAPΦ and the value Pm1(k−1)/Pic1(k−1) which is obtained by dividing the intake-pipe section interior pressure Pm1(k−1) at the time point of the present computation (the present time point) obtained in step 1430 (to be described later) at the time of the previous execution of the routine of FIG. 14 by the intercooler section interior pressure Pic1(k−1) at the time point of the present computation obtained in step 1425 (to be described later) at the time of the previous execution of the routine of FIG. 14.

The CPU 71 then proceeds to step 1520 so as to obtain the throttle-passing-air flow rate mt1(k−1) at the time point of the present computation on the basis of the values obtained in the above-described steps 1510 and 1515, respectively; an equation which is based on the above-described Equation (8) representing the throttle model M11 and shown in the box of step 1520; and the intercooler section interior pressure Pic1(k−1) and the intercooler section interior temperature Tic1(k−1) at the time point of the present computation obtained in step 1425 (to be described later) at the time of the previous execution of the routine of FIG. 14. Subsequently, the CPU 71 proceeds to step 1410 of FIG. 14 via step 1595.

In step 1410, the CPU 71 obtains the value c of the above-described Equation (10) representing the intake valve model M12 on the basis of the above-described table MAPC, the engine speed NE at the present time point and the open-close timing VT of the intake valve 32 at the present time point. Similarly, the CPU 71 obtains the value d on the basis of the above-described table MAPD, the engine speed NE at the present time point and the open-close timing VT of the intake valve 32 at the present time point. Subsequently, in step 1410, the CPU 71 obtains the cylinder-inflow-air flow rate mc1(k−1) at the time point of the present computation on the basis of an equation based on the above-described Equation (10) representing the intake valve model M12 and shown in the box of step 1410; the intake-pipe section interior pressure Pm1(k−1) and intake-pipe section interior temperature Tm1(k−1) at the time point of the present computation obtained in step 1430 (to be described later) at the time of the previous execution of the present routine; and the intake-air temperature Ta at the present time point.

Figure 16:
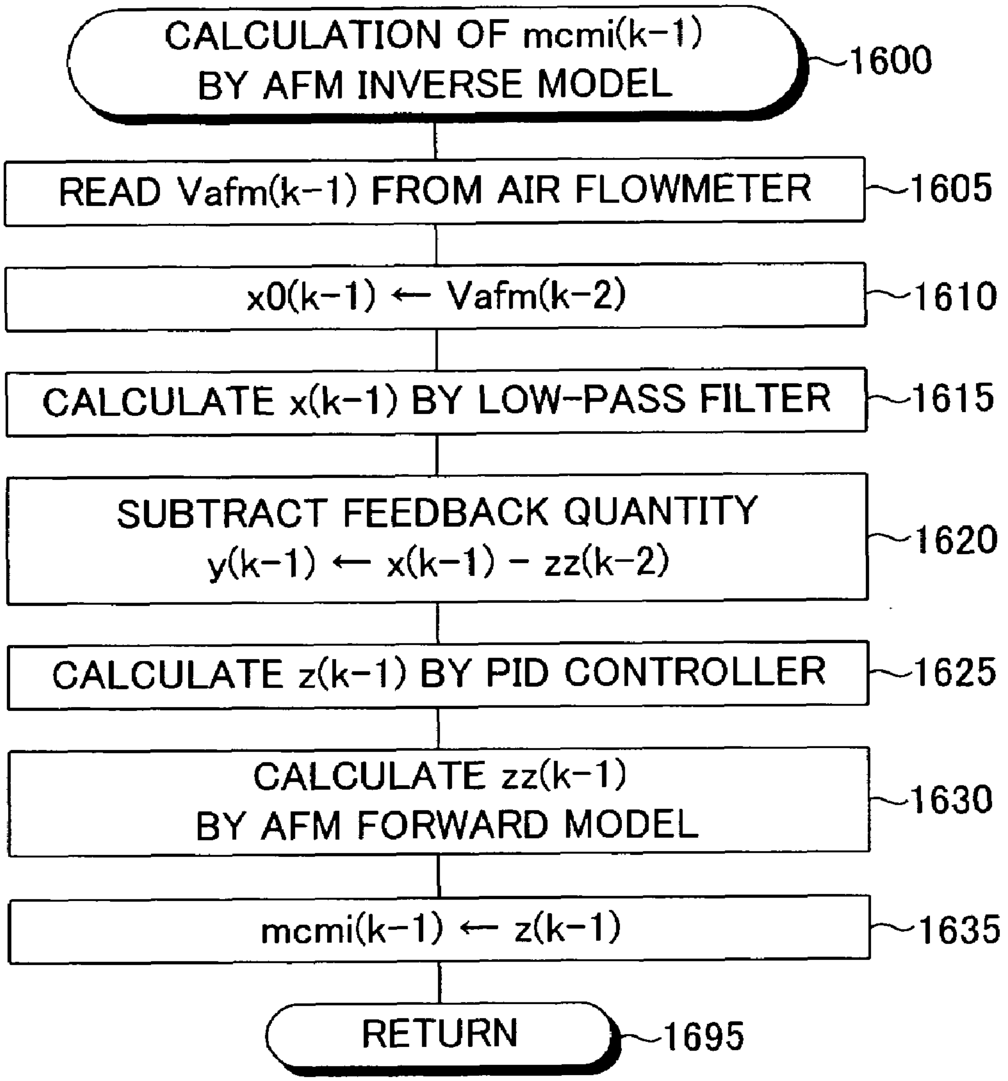
FIG. 16 is a flowchart showing a program that the CPU shown in FIG. 1 executes so as to estimate an actual compressor-inflow-air flow rate.

Next, the CPU 71 proceeds to step 1415, and then proceeds to step 1600 of a flowchart of FIG. 16 so as to obtain a compressor-inflow-air flow rate mcmi(k−1) by use of the above-described AFM inverse model M1. Notably, executing the routine of FIG. 16 corresponds to accomplishing the function of the compressor-inflow-air-flow-rate estimation means.

The CPU 71 then proceeds to step 1605 so as to read the output quantity Vafm(k−1) of the air flowmeter 61, and stores the read output quantity Vafm(k−1) in the RAM 73. Notably, executing the processing of step 1605 corresponds to accomplishing the function of the air-flowmeter-output-quantity storage means.

Subsequently, the CPU 71 proceeds to step 1610, and then the output quantity Vafm(k−2) of the air flowmeter 61 at the time point of the previous computation, which was read in the above-described step 1605 during the previous execution of the present routine and stored in the RAM 73, is set to be used as an input quantity x0(k−1) for the AFM inverse model M1.

As described above, after elapse of the predetermined throttle valve opening calculation time (in the present example, 8 ms) from the time point when the output quantity Vta is output from the throttle position sensor 64, the actual throttle valve opening θta based on the output quantity Vta is calculated, and the calculated actual throttle valve opening θta is obtained in the above-described step 1505 of FIG. 15.

In view of the above, in the present embodiment, as shown in the above-described step 1610, the output quantity Vafm (k−2) of the air flowmeter 61 stored in the RAM 73 at a time point (the time point of the previous computation) earlier than the present time point by the predetermined throttle valve opening calculation time is input (fed) to the AFM inverse model M1 as the input quantity x0(k−1) of the AFM inverse model M1 at the present time point (the time point of the present computation; that is, a time point later than the time point of the previous computation by the computation period ΔTt2 (8 ms).

By virtue of this processing, as will be described later, the compressor-inflow-air flow rate mcmi (k−1) is estimated on the basis of the output quantity Vafm (k−2) of the air flowmeter 61 which was output at the time point same as the time point at which the output quantity Vta of the throttle position sensor 64 from which the latest actual throttle valve opening θta of all the actual throttle valve openings θta having been calculated before the present time point was calculated was output. Accordingly, the throttle valve opening θta and the compressor-inflow-air flow rate mcmi (k−1) based on the respective output quantities output at the same time point can be applied to the first air model M10, whereby the cylinder-interior air quantity can be accurately estimated.

Next, the CPU 71 proceeds to step 1615, and calculates an output quantity x(k−1) by inputting the input quantity x0(k−1) to the low-pass filter M1*a*. After that, the CPU 71 proceeds to step 1620, and calculates a value y(k−1) by subtracting, from the output quantity x(k−1) calculated in step 1615, an output quantity zz(k−2) of the AFM forward model M1*c* (feedback quantity) at the time point of the previous computation, which was calculated in step 1630 (to be described later) during the previous execution of the present routine.

Subsequently, the CPU 71 proceeds to step 1625 so as to calculate an output quantity z(k−1) by inputting the value y(k−1) calculated in step 1620 to the above-described PID controller M1*b*. The CPU 71 then proceeds to step 1630, and calculates an output quantity zz(k−1) by inputting the output quantity z(k−1) calculated in step 1625 to the AFM forward model M1*c*.

Next, the CPU 71 proceeds to step 1635, and sets the output quantity z(k−1) calculated in step 1625 to be used as the compressor-inflow-air flow rate mcmi(k−1). The CPU 71 then proceeds to step 1420 of FIG. 14 via step 1695.

Figure 17:
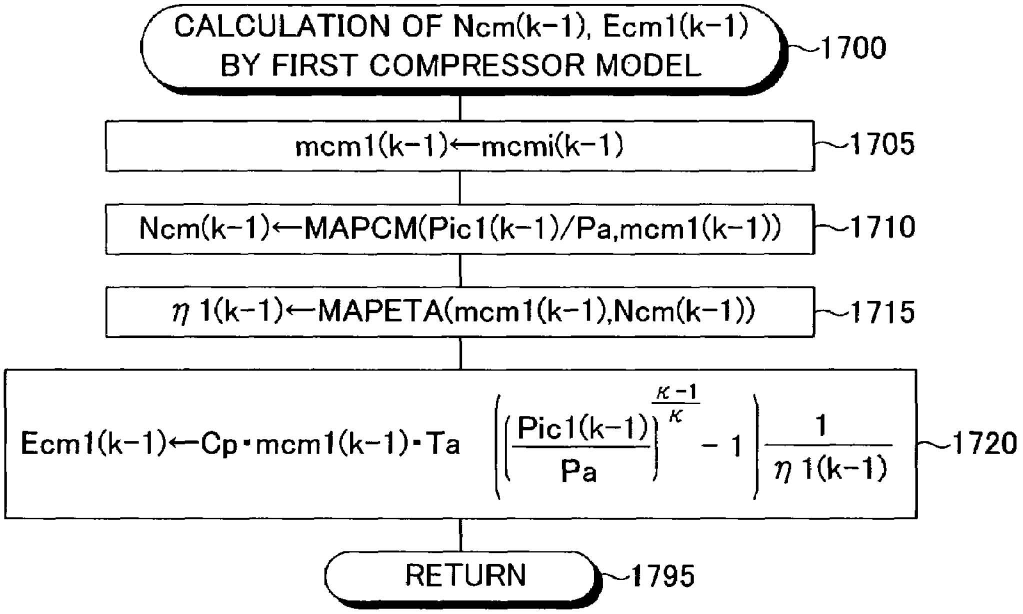
FIG. 17 is a flowchart showing a program that the CPU shown in FIG. 1 executes so as to estimate the compressor rotational speed and a compressor applied energy.

In step 1420, the CPU 71 proceeds to step 1700 of a flowchart of FIG. 17 so as to obtain the compressor rotational speed Ncm(k−1) and the compressor applied energy Ecm1 (k−1) by use of the above-described first compressor model M13.

Subsequently, the CPU 71 proceeds to step 1705, and sets the compressor-inflow-air flow rate mcmi(k−1) obtained in the above-described step 1635 of FIG. 16 to be used as a compressor-outflow-air flow rate mcm1(k−1). After that, the CPU 71 proceeds to step 1710, and obtains the compressor rotational speed Ncm(k−1) at the time point of the present computation on the basis of the above-described table MAPCM; the value Pic1(k−1)/Pa which is obtained by dividing, by the intake-air pressure Pa at the present time point, the intercooler section interior pressure Pic1(k−1) at the time point of the present computation obtained in step 1425 (to be described later) at the time of the previous execution of the routine of FIG. 14; and the compressor-outflow-air flow rate mcm1(k−1) stored in step 1705. Notably, executing the processing of step 1710 corresponds to accomplishing the function of the compressor-rotational-speed obtaining means. Further, executing the processing of steps 1705 and 1710 corresponds to accomplishing a portion of the function of the compressor-outflow-air-flow-rate estimation means.

Subsequently, the CPU 71 proceeds to step 1715, and obtains the compressor efficiency η1(k−1) on the basis of the above-described table MAPETA; the compressor-outflow-air flow rate mcm1(k−1) stored in step 1705; and the compressor rotational speed Ncm(k−1) obtained in step 1710.

Next, the CPU 71 proceeds to step 1720, and obtains the compressor applied energy Ecm1(k−1) at the time point of the present computation on the basis of the value Pic1(k−1)/Pa, which is obtained by dividing, by the intake-air pressure Pa at the present time point, the intercooler section interior pressure Pic1(k−1) at the time point of the present computation obtained in step 1425 (to be described later) at the time of the previous execution of the routine of FIG. 14; the compressor-outflow-air flow rate mcm1(k−1) stored in step 1705; the compressor efficiency η1(k−1) obtained in step 1715; the intake-air temperature Ta at the present time point; and an equation, which is shown in the box of step 1720, based on the above-described Equation (13) representing a portion of the first compressor model M13. The CPU 71 then proceeds to step 1425 of FIG. 14 via step 1795. Notably, executing the processing of steps 1715 and 1720 corresponds to accomplishing the function of the compressor-applied-energy estimation means.

In step 1425, the CPU 71 obtains an intercooler section interior pressure Pic1(k) at the time point of the next computation and a value {Pic1/Tic1}(k) which is obtained by dividing the intercooler section interior pressure Pic1(k) by the intercooler section interior temperature Tic1(k) at the time point of the next computation, on the basis of equations (difference equations), which are shown in the box of step 1425, based on the above-described Equations (20) and (21) obtained by discretizing the above-described Equations (18) and (19) representing the intercooler model M114; and the throttle-passing-air flow rate mt1(k−1), the compressor-outflow-air flow rate mcm1(k−1) and the compressor applied energy Ecm1(k−1) obtained in the above-descried steps 1405 and 1420. Notably, Δt1 represents a time step (time discrete interval) used in the intercooler model M14 and the intake pipe model M15 to be described later and is represented by an equation (Δt1=ΔTt2). That is, in step 1425, the intercooler section interior pressure Pic1(k) and intercooler section interior temperature Tic1(k) at the time point of the next computation are obtained from the intercooler section interior pressure Pic1(k−1) and intercooler section interior temperature Tic1(k−1) at the time point of the present computation, etc. Notably, executing the processing of step 1425 corresponds to accomplishing a portion of the function of the present compressor-downstream-pressure estimation means.

Next, the CPU 71 proceeds to step 1430, and obtains the intake-pipe section interior pressure Pm1(k) at the time point of the next computation and a value {Pm1/Tm1}(k) which is obtained by dividing the intake-pipe section interior pressure Pm1(k) by the intake-pipe section interior temperature Tm1 (k) at the time point of the next computation, on the basis of equations (difference equations), which are shown in the box of step 1430, based on the above-described Equations (29) and (30) obtained by discretizing the above-described Equations (27) and (28) representing the intake pipe model M15; the throttle-passing-air flow rate mt1(k−1) and the cylinder-inflow-air flow rate mc1(k−1) obtained in the above-descried steps 1405 and 1410, respectively; and the intercooler section interior temperature Tic1(k−1) at the time point of the present computation, which was obtained in the above-described step 1425 during the previous execution of the present routine. That is, in step 1430, the intake-pipe section interior pressure Pm1(k) and intake-pipe section interior temperature Tm1(k) at the time point of the next computation are obtained from the intake-pipe section interior pressure Pm1(k−1) and intake-pipe section interior temperature Tm1(k−1) at the time point of the present computation, etc.

Subsequently, the CPU 71 proceeds to step 1495, and ends the current execution of the present routine.

As described above, as a result of execution of the routine of FIG. 14, the actual compressor-inflow-air flow rate mcmi (k−1) is estimated on the basis of the output quantity Vafm of the air flowmeter 61. Next, the compressor rotational speed Ncm(k−1) at the present time point is estimated on the basis of the estimated actual compressor-inflow-air flow rate mcmi (k−1); and the intercooler section interior pressure Pic1(k), intercooler section interior temperature Tic1(k), intake-pipe section interior pressure Pm(k) and intake-pipe section interior temperature Tm(k) at a time point (the time point of the next computation) later than the time point of the present computation by the minute time Δt1 are estimated on the basis of the estimated actual compressor-inflow-air flow rate mcmi (k−1).

<Calculation of Cylinder-Interior Air Quantity by the Second Air Model M20>

Meanwhile, when the execution of the routine of FIG. 14 ends, the CPU 71 executes a routine shown by a flowchart in FIG. 18 so as to calculate the cylinder-interior air quantity by use of the second air model M20 to thereby estimate the cylinder-interior air quantity KLfwd at a future time point which is later than the time point at which the present routine is executed. Notably, executing the routine of FIG. 18 corresponds to accomplishing a portion of the function of the cylinder-interior-air-quantity estimation means.

Figure 19:
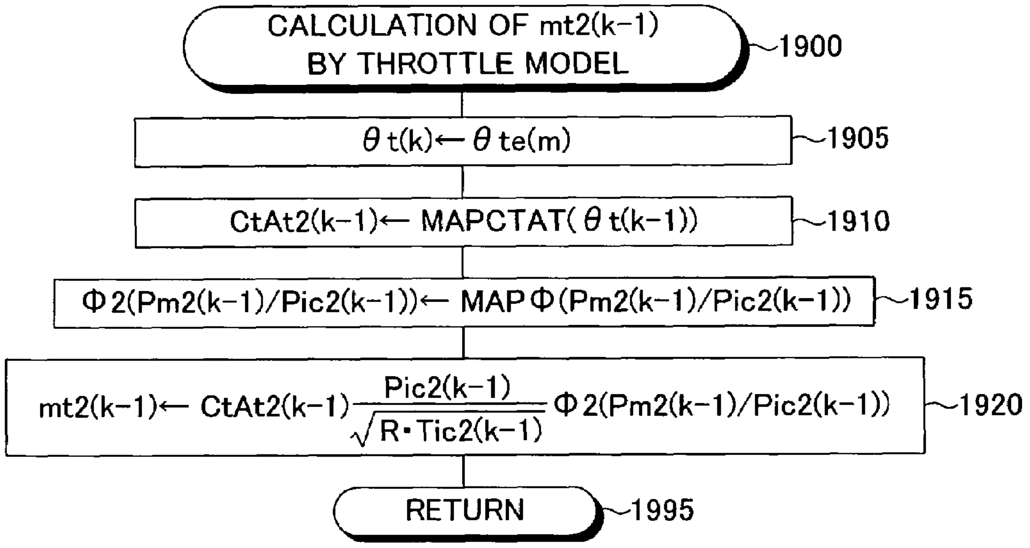
FIG. 19 is a flowchart showing a program that the CPU shown in FIG. 1 executes so as to estimate the throttle-passing air flow rate on the basis of the estimated throttle valve opening.

Specifically, at a predetermined timing, the CPU 71 starts processing from step 1800, proceeds to step 1805, and then proceeds to step 1900 of a flowchart shown in FIG. 19 so as to obtain the throttle-passing-air flow rate mt2(k−1) by the above-described throttle model M21.

Subsequently, the CPU 71 proceeds to step 1905, and reads, as the predicted throttle valve opening θt(k), the predicted throttle valve opening θte(m) estimated as the throttle valve opening at a time point closest to a time point which is later than the present time point by a predetermined time interval Δt0 (in the present example, a time period between a predetermined time point before the fuel injection start time of a specific cylinder (the last time point before which the fuel injection quantity must be determined) and a time point at which the intake valve 32 closes in the intake stroke of the cylinder (intake stroke end time), from the predicted throttle valve openings θte(m) (m is an integer between 0 and ntdly) stored in the memory by the throttle-valve-opening estimation routine of FIG. 13. As described above, k represents the number of times that the execution of the routine of FIG. 14 has been started. The present routine is successively executed after completion of the execution of the routine of FIG. 14. Accordingly, the k also represents the number of times that the execution of the present routine has been started.

Figure 20:
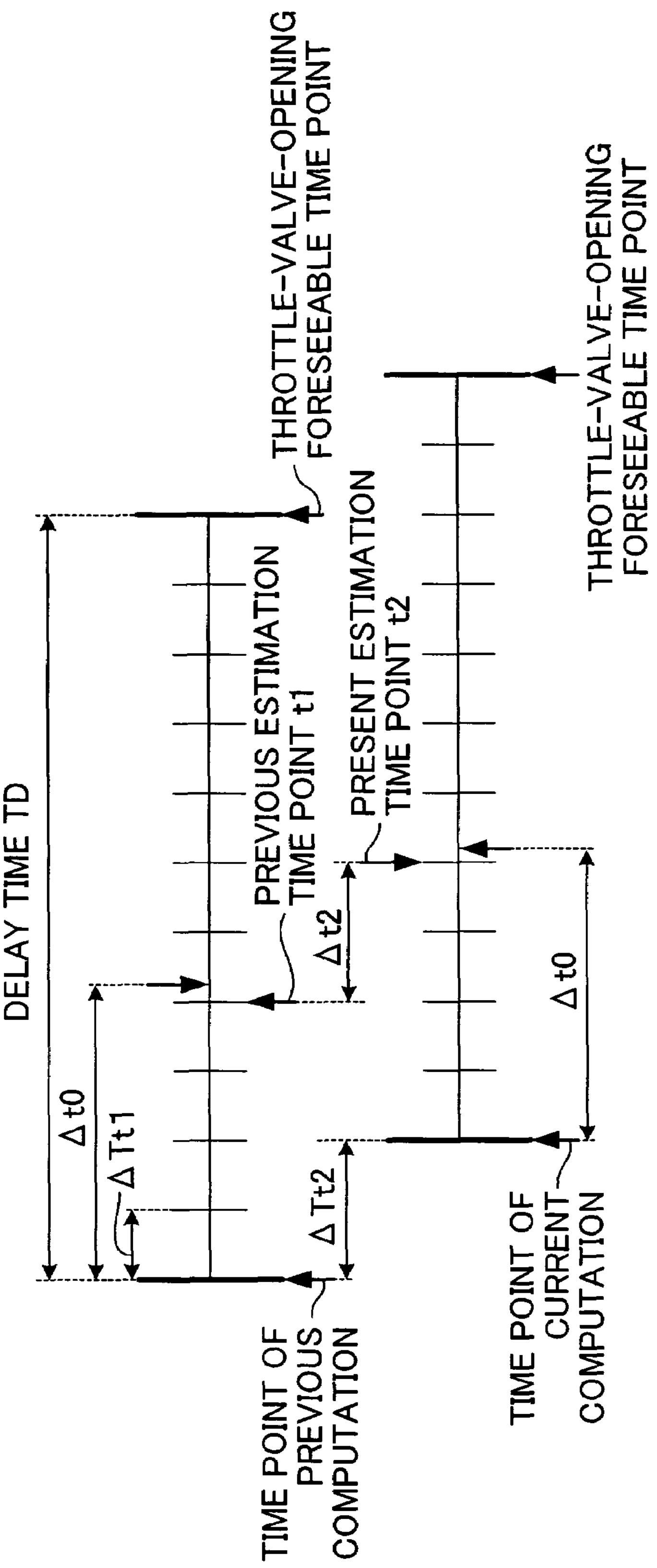
FIG. 20 is an illustration showing the relation among a throttle-valve-opening foreseeable time point, a predetermined time interval Δt0, a previous estimation time point t1 and a present estimation time point t2.

In the following description, in order to facilitate understanding, a time point corresponding to the predicted throttle valve opening θt(k−1) read in step 1905 at the time point of the previous computation (the time point of the (k−1)-th time execution of the present routine) is called a previous estimation time point t1, and a time point corresponding to the predicted throttle valve opening θt(k) read in step 1905 at the time point of the present computation (the time point of the k-th time execution of the present routine) is called a present estimation time point t2 (see FIG. 20, which is an illustration showing a relation among the throttle-valve-opening foreseeable time points, the predetermined time interval Δt0, the previous estimation time point t1 and the present estimation time point t2).

The CPU 71 then proceeds to step 1910 so as to obtain, as a value CtAt2(k−1), the Ct(θt)·At(θt) of the above-described Equation (8) on the basis of the above-described table MAPCTAT and the predicted throttle valve opening θt(k−1) read in step 1905 at the time point of the previous computation.

Next, the CPU 71 proceeds to step 1915, and obtains the value Φ2(Pm2(k−1)/Pic2(k−1)) on the basis of the above-described table MAPΦ and the value Pm2(k−1)/Pic2(k−1) which is obtained by dividing the intake-pipe section interior pressure Pm2(k−1) at the previous estimation time point t1 obtained in step 1825 (to be described later) at the time of the previous execution of the routine of FIG. 18 by the intercooler section interior pressure Pic2(k−1) at the previous estimation time point t1 obtained in step 1820 (to be described later) at the time of the previous execution of the routine of FIG. 18.

Figure 18:
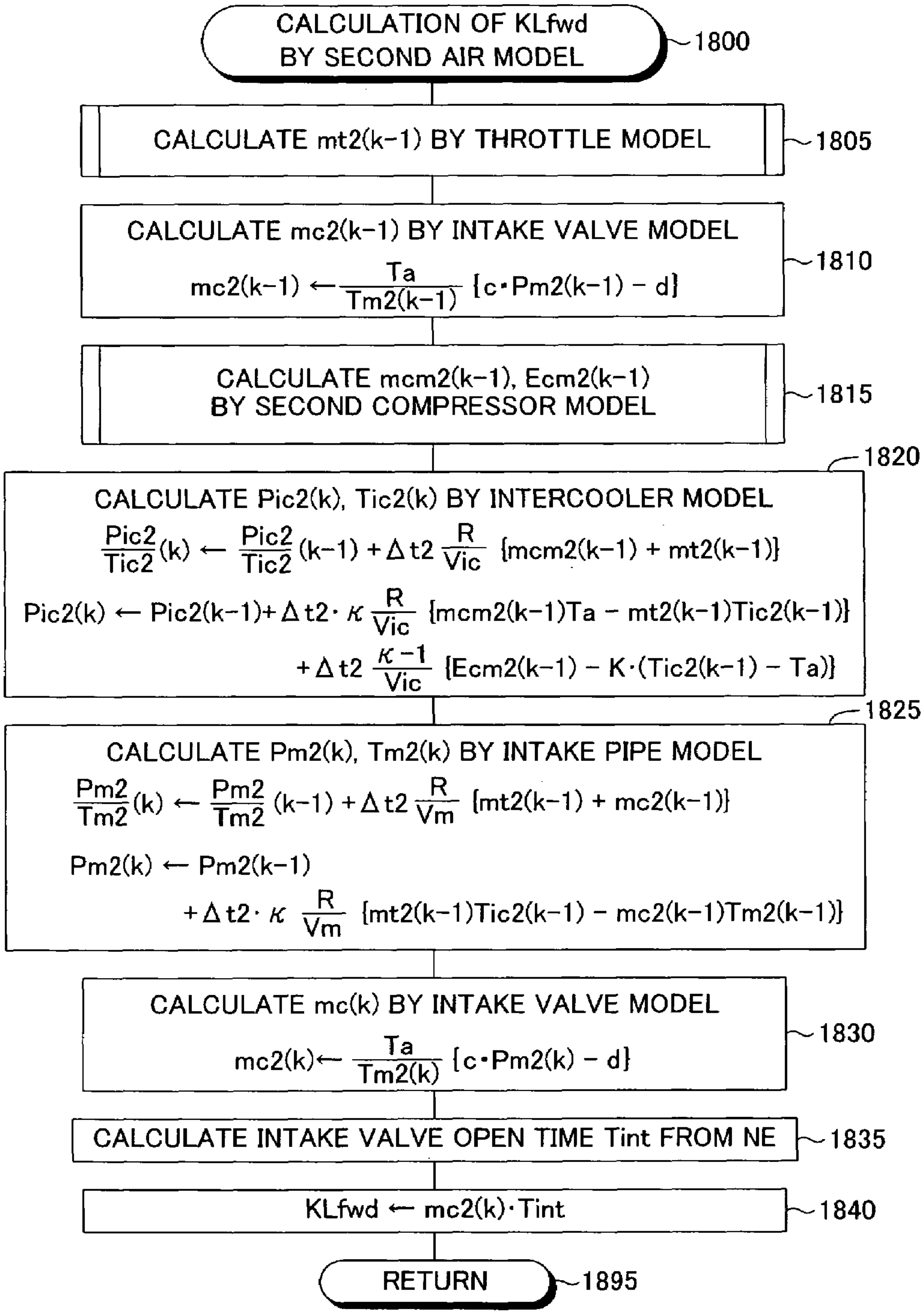
FIG. 18 is a flowchart showing a program that the CPU shown in FIG. 1 executes so as to estimate the cylinder-interior air quantity by use of the second air model.

The CPU 71 then proceeds to step 1920 so as to obtain the throttle-passing-air flow rate mt2(k−1) at the previous estimation time point t1 on the basis of the values obtained in the above-described steps 1910 and 1915, respectively; an equation which is based on the above-described Equation (8) representing the throttle model M21 and shown in the box of step 1920; and the intercooler section interior pressure Pic2 (k−1) and the intercooler section interior temperature Tic2(k−1) at the previous estimation time point t1 obtained in step 1820 (to be described later) at the time of the previous execution of the routine of FIG. 18. Subsequently, the CPU 71 proceeds to step 1810 of FIG. 18 via step 1995.

In step 1810, the CPU 71 obtains a cylinder-inflow-air flow rate mc2(k−1) at the previous estimation time point t1 on the basis of an equation based on Equation (10) representing the intake valve model M22 and shown in the box of step 1810; the intake-pipe section interior pressure Pm2(k−1) and intake-pipe section interior temperature Tm2(k−1) at the previous estimation time point t1 obtained in step 1825 (to be described later) at the time of the previous execution of the present routine; and the intake-air temperature Ta at the present time point. At this time, the values c and d obtained in the above-described step 1410 of FIG. 14 are used as the values c and d in step 1810.

Figure 21:
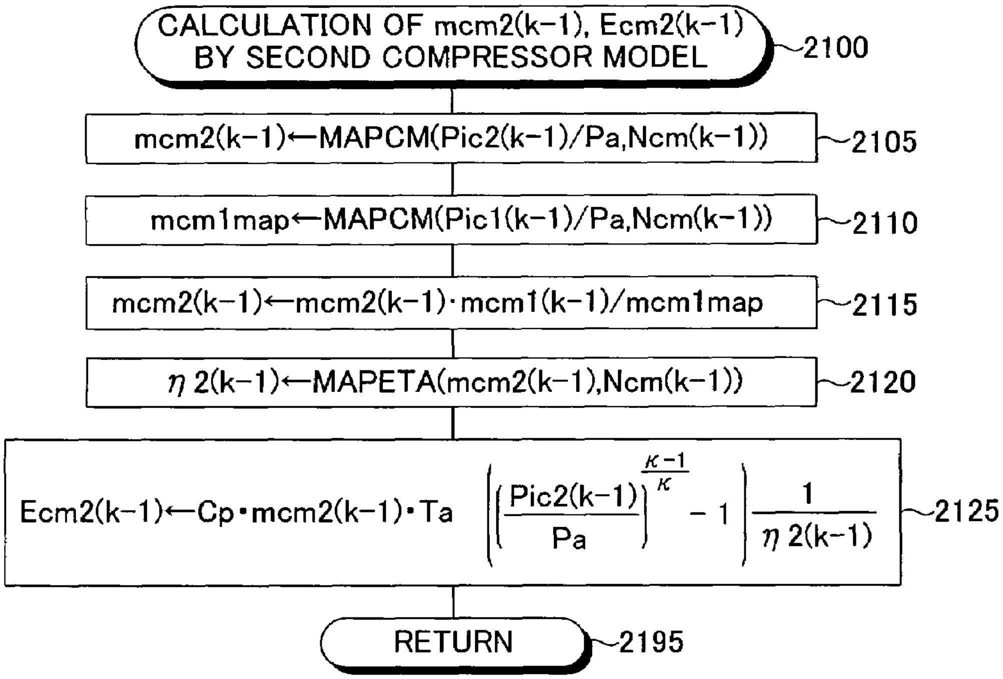
FIG. 21 is a flowchart showing a program that the CPU shown in FIG. 1 executes so as to estimate the compressor-outflow-air flow rate and the compressor applied energy.

Next, the CPU 71 proceeds to step 1815, and then proceeds to step 2100 of a flowchart of FIG. 21 so as to obtain the compressor-outflow-air flow rate mcm2(k−1) and the compressor applied energy Ecm2(k−1) by use of the above-described second compressor model M23.

Subsequently, the CPU 71 proceeds to step 2105, and obtains the compressor-outflow-air flow rate mcm2(k−1) at the previous estimation time point t1 on the basis of the above-described table MAPCM; the value Pic2(k−1)/Pa which is obtained by dividing, by the intake-air pressure Pa at the present time point, the intercooler section interior pressure Pic2(k−1) at the previous estimation time point t1 obtained in step 1820 (to be described later) at the time of the previous execution of the routine of FIG. 18; and the compressor rotational speed Ncm(k−1) obtained in the above-described step 1420 of FIG. 14 and employed as the compressor rotational speed at the previous estimation time point t1. Notably, executing the processing of step 2105 corresponds to accomplishing the function of the future-compressor-outflow-air-flow-rate obtaining means.

Subsequently, the CPU 71 proceeds to 2110, and obtains the compressor-outflow-air flow rate mcm1map at the time point of the present computation obtained by use of the above-described table MAPCM, on the basis of the above-described table MAPCM; the value Pic1(k−1)/Pa which is obtained by dividing, by the intake-air pressure Pa at the present time point, the intercooler section interior pressure Pic1(k−1) at the time point of the present computation obtained in the above-described step 1425 at the time of the previous execution of the routine of FIG. 14; and the compressor rotational speed Ncm(k−1) obtained in the above-described step 1420 of FIG. 14. Notably, executing the processing of step 2110 corresponds to accomplishing the function of the present-compressor-outflow-air-flow-rate obtaining means.

Next, the CPU 71 proceeds to step 2115, and updates the compressor-outflow-air flow rate mcm2(k−1) at the previous estimation time point t1 with a first value obtained by multiplying a second value by the compressor-outflow-air flow rate mcm2(k−1) at the previous estimation time point t1 obtained in the above-described step 2105, the second value being obtained by dividing the compressor-inflow-air flow rate mcmi(k−1), which is obtained in the above-described step 1415 of FIG. 14 and is employed as the compressor-outflow-air flow rate mcm1(k−1) at the time point of the present computation, by the compressor-outflow-air flow rate mcm1map, which is obtained in the above-described step 2110, at the time point of the present computation obtained by use of the table MAPCM.

Incidentally, since the compressor rotational speed varies in a considerably wide range, in order to reduce the number of data sets in the table MAPCM, the difference between adjacent data sets of the compressor rotational speed in the table MAPCM is relatively large. Accordingly, the compressor rotational speed Ncm(k−1) obtained in the above-described step 1420 of FIG. 14 contains an error. Therefore, if the compressor-outflow-air flow rate mcm2(k−1) at the previous estimation time point t1 is obtained on the basis of the table MAPCM and the obtained compressor rotational speed Ncm (k−1) as shown in the above-described step 2105, the obtained compressor-outflow-air flow rate mcm2(k−1) at the previous estimation time point t1 contains an error.

In view of this, in the present embodiment, a ratio between the compressor-outflow-air flow rate mcm1(k−1) at the time point of the present computation obtained without use of the table MAPCM and the compressor-outflow-air flow rate mcm1map at the time point of the present computation obtained by use of the table MAPCM (the ratio mcm1(k−1)/mcm1map of the compressor-outflow-air flow rate mcm1(k−1) to the compressor-outflow-air flow rate mcm1map) is obtained as a correction coefficient; and the compressor-outflow-air flow rate mcm2(k−1) at the previous estimation time point t1 obtained by use of the table MAPCM is multiplied by the correction coefficient, whereby the compressor-outflow-air flow rate mcm2(k−1) is corrected.

With this processing, the error contained in the compressor-outflow-air flow rate mcm2(k−1) at the previous estimation time point t1 obtained by use of the table MAPCM is corrected. Therefore, the compressor-outflow-air flow rate mcm2(k−1) at the previous estimation time point t1 can be accurately estimated without increasing the number of data sets in the table MAPCM. Notably, executing the processing of step 2115 corresponds to accomplishing the function of the future-compressor-outflow-air-flow-rate correction means. Further, executing the processing of steps 2105 to 2115 corresponds to accomplishing a portion of the function of the compressor-outflow-air-flow-rate estimation means.

Subsequently, the CPU 71 proceeds to 2120, and obtains the compressor efficiency η2(k−1) from the above-described table MAPETA; the compressor-outflow-air flow rate mcm2 (k−1) obtained in step 2115; and the compressor rotational speed Ncm(k−1) obtained in the above-described step 1420 of FIG. 14.

Next, the CPU 71 proceeds to 2125, and obtains the compressor applied energy Ecm2(k−1) at the previous estimation time point t1 on the basis of the value Pic2(k−1)/Pa which is obtained by dividing, by the intake-air pressure Pa at the present time point, the intercooler section interior pressure Pic2(k−1) at the previous estimation time point t1 obtained in step 1820 (to be described later) at the time of the previous execution of the routine of FIG. 18; the compressor-outflow-air flow rate mcm2(k−1) obtained in step 2115; the compressor efficiency η2(k−1) obtained in step 2120; the intake-air temperature Ta at the present time point; and an equation, which is shown in the box of step 2125, based on the above-described Equation (13) representing a portion of the second compressor model M23. The CPU 71 then proceeds to step 1820 of FIG. 18 via step 2195.

In step 1820, the CPU 71 obtains the intercooler section interior pressure Pic2(k) at the present estimation time point t2 and the value {Pic2/Tic2}(k) which is obtained by dividing the intercooler section interior pressure Pic2(k) by the intercooler section interior temperature Tic2(k) at the present estimation time point t2, on the basis of equations (difference equations), which are shown in the box of step 1820, based on the above-described Equations (20) and (21) obtained by discretizing the above-described Equations (18) and (19) representing the intercooler model M24; and the throttle-passing-air flow rate mt2(k−1), the compressor-outflow-air flow rate mcm2(k−1) and the compressor applied energy Ecm2(k−1) obtained in the above-descried steps 1805 and 1815. Notably, Δt2 represents a time step (time discrete interval) used in the intercooler model M24 and the intake pipe model M25 to be described later and is represented by an equation (Δt2=t2−t1). That is, in step 1820, the intercooler section interior pressure Pic2(k) and intercooler section interior temperature Tic2(k) at the present estimation time point t2 are obtained from the intercooler section interior pressure Pic2(k−1) and intercooler section interior temperature Tic2(k−1) at the previous estimation time point t1, etc. Notably, executing the processing of step 1820 corresponds to accomplishing a portion of the function of the present compressor-downstream-pressure estimation means.

Next, the CPU 71 proceeds to step 1825, and obtains the intake-pipe section interior pressure Pm2(k) at the present estimation time point t2 and the value {Pm2/Tm2}(k) which is obtained by dividing the intake-pipe section interior pressure Pm2(k) by the intake-pipe section interior temperature Tm2(k) at the present estimation time point t2, on the basis of equations (difference equations), which are shown in the box of step 1825, based on the above-described Equations (29) and (30) obtained by discretizing the above-described Equations (27) and (28) representing the intake pipe model M25; the throttle-passing-air flow rate mt2(k−1) and the cylinder-inflow-air flow rate mc2(k−1) obtained in the above-descried steps 1805 and 1810, respectively; and the intercooler section interior temperature Tic2(k−1), which was obtained in the above-described step 1820 during the previous execution of the present routine, at the previous estimation time point t1. That is, in step 1825, the intake-pipe section interior pressure Pm2(k) and intake-pipe section interior temperature Tm2(k) at the present estimation time point t2 are obtained from the intake-pipe section interior pressure Pm2(k−1) and intake-pipe section interior temperature Tm2(k−1) at the previous estimation time point t1, etc.

Subsequently, the CPU 71 proceeds to step 1830, and obtains the cylinder-inflow-air flow rate mc2(k) at the present estimation time point t2 by use of the above-described Equation (10) representing the intake valve model M26. At this time, the values c and d obtained in the above-described step 1410 of FIG. 14 are used as the values c and d in step 1830. Further, the intake-pipe section interior pressure Pm2(k) and intake-pipe section interior temperature Tm2(k) (latest values) at the present estimation time point t2 obtained in the above-described step 1825 are used in step 1830.

The CPU 71 then proceeds to step 1835 so as to calculate the intake valve open time (time during which the intake valve 32 is in the opened state) Tint, which can be obtained on the basis of the engine speed NE at the present time point and the open-close timing VT of the intake valve 32 at the present time point, and then proceeds to step 1840 so as to calculate the cylinder-interior air quantity KLfwd by multiplying the cylinder-inflow-air flow rate mc2(k) at the present estimation time point t2 by the intake valve open time Tint. Subsequently, the CPU 71 proceeds to step 1895 so as to end the current execution of the present routine.

As a result of execution of the routine of FIG. 18, the intercooler section interior pressure Pic2(k), intercooler section interior temperature Tic2(k), intake-pipe section interior pressure Pm2(k) and intake-pipe section interior temperature Tm2(k) at the present estimation time point t2 later than the present time point are estimated on the basis of the compressor rotational speed Ncm(k−1) at the present time point, and the cylinder-interior air quantity KLfwd at the present estimation time point t2 is estimated.

As described above, in the embodiment of the air quantity estimation apparatus for an internal combustion engine of the present invention, the output quantity Vafm of the air flowmeter 61 is supplied to the AFM inverse model M1 as the input quantity x0 of the AFM inverse model M1 to thereby obtain the output quantity z of the AFM inverse model M1 as the actual compressor-inflow-air flow rate mcmi at the present time point. By virtue of this, the detection delay of the air flowmeter 61 in relation to the actual compressor-inflow-air flow rate mcmi can be compensated for. Therefore the actual compressor-inflow-air flow rate mcmi can be accurately estimated.

Further, the present embodiment employs the AFM inverse model M1 which uses the AFM forward model M1$c$ in the feedback loop. Accordingly, even when a mathematically strict inverse model cannot be constructed because of complexity of the AFM forward model M1$c$, a sufficiently accurate inverse model of the AFM forward model M1$c$ can be readily constructed.

Moreover, the present embodiment estimates the compressor rotational speed Ncm at the present time point on the basis of the table MAPCM stored in the ROM 72, the estimated actual compressor-inflow-air flow rate mcmi employed as the compressor-outflow-air flow rate mcm1 at the present time point and the value Pic1/Pa which is obtained by dividing, by the intake-air pressure Pa at the present time point, the intercooler section interior pressure (compressor downstream pressure) Pic1 estimated by the first air model M10.

In addition, the present embodiment estimates the compressor-outflow-air flow rate mcm2 at the future time point after the present time point on the basis of the table MAPCM stored in the ROM 72, the value Pic2/Pa which is obtained by dividing, by the intake-air pressure Pa at the present time point, the intercooler section interior pressure (compressor downstream pressure) Pic2 estimated by the second air model M20 and the estimated compressor rotational speed Ncm at the present time point employed as the compressor rotational speed at the future time point.

Moreover, the present embodiment estimates the cylinder-interior air quantity KLfwd at the future time point on the basis of the estimated compressor-outflow-air flow rate mcm2 at the future time point. As a result, the cylinder-interior air quantity KLfwd at the future time point can be accurately estimated.

Notably, the present invention is not limited to the above-described embodiment, and various modifications may be employed within the scope of the present invention. For example, in the above-described embodiment, the delay time TD is constant. However, the delay time may be a variable time which varies in accordance with the engine speed NE; such as a time T270 which the engine 10 requires to rotate the crankshaft 24 by a predetermined crank angle (e.g., 270° in crank angle).

In the above-described embodiment, the intercooler 45 is of an air-cooling type. However, the intercooler 45 may be of a water-cooling type in which air flowing through the intake passage is cooled by means of circulated cooling water. In this case, the air quantity estimation apparatus may include a water temperature sensor for detecting the temperature Tw of the cooling water, and obtain energy (heat exchange energy) exchanged between air within the intercooler 45 and the wall of the intercooler 45 on the basis of the temperature Tw of the cooling water detected by the water temperature sensor. That is, in the intercooler model M14 and the intercooler model M24, in place of the above-described Equation (19), the following Equation (32) is used.

$$dPic/dt=\kappa\cdot(R/Vic)\cdot(mcm\cdot Ta-mt\cdot Tic)+(\kappa-1)/(Vic)\cdot(Ecm-K\cdot(Tic-Tw)) \quad (32)$$

In the above-described embodiment, the air flowmeter 61 is of a hot wire type. However, an air flowmeter of the other type may be used. Further, in the above-described embodiment, the turbocharger 91 is a turbo-type supercharger. However, a supercharger of a mechanical or electrical type may be used instead of the turbocharger 91.

What is claimed is:

1. An air quantity estimation apparatus for an internal combustion engine having an intake passage for introducing outside air into a cylinder and a turbocharger including a compressor disposed in the intake passage and compressing air within the intake passage, the air quantity estimation apparatus estimating a cylinder-interior air quantity which is a quantity of air having been introduced into the cylinder, and the air quantity estimation apparatus comprising:

an air flowmeter disposed in the intake passage upstream of the compressor and converting a flow rate of air passing through the intake passage, the flow rate being an input quantity, to an electrical physical quantity being an output quantity, and outputting the electrical physical quantity;

compressor-inflow-air-flow-rate estimation means including an inverse model which is a model inverse to a forward model of the air flowmeter, the forward model describing the relation between the input quantity and the output quantity of the air flowmeter, and is configured such that when an output quantity of the forward model is supplied to the inverse model as an input quantity, the inverse model outputs a corresponding input quantity of the forward model as an output quantity, wherein the compressor-inflow-air-flow-rate estimation means obtains the output quantity of the inverse model as a compressor-inflow-air flow rate which is a flow rate of air actually flowing into the compressor at a present time point by supplying the electrical physical quantity actually output from the air flowmeter to the inverse model as the input quantity of the inverse model; and cylinder-interior-air-quantity estimation means including an air model which describes, in accordance with physical laws, behavior of air within the intake passage downstream of the compressor by use of a compressor-outflow-air flow rate which is a flow rate of air flowing out of the compressor into the intake passage, wherein the cylinder-interior-air-quantity estimation means estimates the cylinder-interior air quantity by applying the obtained compressor-inflow-air flow rate at the present time point as the compressor-outflow-air flow rate at the present time point to the air model.

2. The air quantity estimation apparatus for an internal combustion engine according to claim 1, wherein:

the air model of the cylinder-interior-air-quantity estimation means describes the behavior of air by use of compressor applied energy which is applied to air passing through the compressor by the compressor, the compressor applied energy varying in accordance with a rotational speed of the compressor; and the cylinder-interior-air-quantity estimation means includes:

compressor-operation-condition-relation storage means for previously storing a compressor operation condition relation which is a relation between the compressor-outflow-air flow rate and the rotational speed of the compressor;

compressor-rotational-speed obtaining means for obtaining the rotational speed of the compressor at the present time point on the basis of the stored compressor operation condition relation and the compressor-outflow-air flow rate at the present time point applied to the air model; and compressor-applied-energy estimation means for estimating the compressor applied energy at the present time point on the basis of the obtained rotational speed of the compressor at the present time point, wherein the cylinder-interior-air-quantity estimation means estimates the cylinder-interior air quantity by applying the estimated compressor applied energy at the present time point to the air model.

3. The air quantity estimation apparatus for an internal combustion engine according to claim 1, wherein the compressor-inflow-air-flow-rate estimation means includes a feedback loop in which a value obtained by subtracting a predetermined feedback quantity from a predetermined input quantity is input to a PID controller, a quantity output from the PID controller is input to the forward model of the air flow model as an input quantity of the forward model, and an output quantity of the forward model is used as the predetermined feedback quantity, wherein the compressor-inflow-air-flow-rate estimation means is configured to obtain the quantity output from the PID controller as the output quantity of the inverse model by giving the electrical physical quantity actually output from the air flowmeter as the predetermined input quantity.

4. The air quantity estimation apparatus for an internal combustion engine according to claim 2, wherein the compressor-inflow-air-flow-rate estimation means includes a feedback loop in which a value obtained by subtracting a predetermined feedback quantity from a predetermined input quantity is input to a PID controller, a quantity output from the PID controller is input to the forward model of the air flow model as an input quantity of the forward model, and an output quantity of the forward model is used as the predetermined feedback quantity, wherein the compressor-inflow-air-flow-rate estimation means is configured to obtain the quantity output from the PID controller as the output quantity of the inverse model by giving the electrical physical quantity actually output from the air flowmeter as the predetermined input quantity.

5. An air quantity estimation apparatus for an internal combustion engine having an intake passage for introducing outside air into a cylinder, a turbocharger including a compressor disposed in the intake passage and compressing air within the intake passage, and a throttle valve which is disposed in the intake passage to be located downstream of the turbocharger and whose opening can be adjusted to vary a quantity of air flowing through the intake passage, the air quantity estimation apparatus estimating a cylinder-interior air quantity which is a quantity of air having been introduced into the cylinder, and the air quantity estimation apparatus comprising:

an air flowmeter disposed in the intake passage upstream of the compressor and converting a flow rate of air passing through the intake passage, the flow rate being an input quantity, to an electrical physical quantity being an output quantity, and outputting the electrical physical quantity;

compressor-inflow-air-flow-rate estimation means including an inverse model which is a model inverse to a forward model of the air flowmeter, the forward model describing the relation between the input quantity and the output quantity of the air flowmeter, and is configured such that when an output quantity of the forward model is supplied to the inverse model as an input quantity, the inverse model outputs a corresponding input quantity of the forward model as an output quantity, wherein the compressor-inflow-air-flow-rate estimation means supplies the electrical physical quantity actually output from the air flowmeter to the inverse model as the input quantity of the inverse model so as to obtain the output quantity of the inverse model as a compressor-inflow-air flow rate which is a flow rate of air actually flowing into the compressor at a present time point; and cylinder-interior-air-quantity estimation means including an air model which describes, in accordance with physical laws, behavior of air within the intake passage downstream of the compressor by use of at least the opening of the throttle valve and a compressor-outflow-air flow rate which is a flow rate of air flowing out of the compressor into the intake passage; throttle-valve-opening estimation means for estimating the opening of the throttle valve at a future time point after the present time point; and compressor-outflow-air-flow-rate estimation means for estimating the compressor-outflow-air flow rate at the future time point on the basis of the obtained compressor-inflow-air flow rate at the present time point, wherein the cylinder-interior-air-quantity estimation means estimates the cylinder-interior air quantity at the future time point by applying the estimated opening of the throttle valve at the future time point and the estimated compressor-outflow-air flow rate at the future time point to the air model.

6. The air quantity estimation apparatus for an internal combustion engine according to claim 5, further comprising present-compressor-downstream-pressure estimation means for estimating a compressor downstream pressure which is a pressure of air within the intake passage downstream of the compressor at the present time point, wherein the cylinder-interior-air-quantity estimation means includes future-compressor-downstream-pressure estimation means for estimating the compressor downstream pressure at a future time point after the present time point; and the compressor-outflow-air-flow-rate estimation means of the cylinder-interior-air-quantity estimation means includes:

compressor-operation-condition-relation storage means for previously storing a compressor operation condition relation which is a relation among the compressor-outflow-air flow rate, the compressor downstream pressure and the rotational speed of the compressor;

compressor-rotational-speed obtaining means for obtaining the rotational speed of the compressor at the present time point on the basis of the stored compressor operation condition relation, the obtained compressor-inflow-air flow rate at the present time point employed as the compressor-outflow-air flow rate at the present time point and the estimated compressor downstream pressure at the present time point; and future-compressor-outflow-air-flow-rate obtaining means for obtaining the compressor-outflow-air flow rate at the future time point on the basis of the stored compressor operation condition relation, the estimated compressor downstream pressure at the future time point and the obtained rotational speed of the compressor at the present time point employed as the rotational speed of the compressor at the future time point, wherein the cylinder-interior-air-quantity estimation means estimates the cylinder-interior air quantity at the future time point by use of the estimated compressor downstream pressure at the future time point and the obtained compressor-outflow-air flow rate at the future time point.

7. The air quantity estimation apparatus for an internal combustion engine according to claim 6, wherein the compressor-outflow-air-flow-rate estimation means of the cylinder-interior-air-quantity estimation means includes:

present-compressor-outflow-air-flow-rate obtaining means for obtaining the compressor-outflow-air flow rate at the present time point on the basis of the stored compressor operation condition relation, the estimated compressor downstream pressure at the present time point and the obtained rotational speed of the compressor at the present time point; and future-compressor-outflow-air-flow-rate correction means for correcting the compressor-outflow-air flow rate at the future time point obtained by the future-compressor-outflow-air-flow-rate obtaining means, on the basis of a ratio between (a) the compressor-inflow-air flow rate at the present time point, which is employed as the compressor-outflow-air flow rate at the present time point, obtained by the compressor-inflow-air-flow-rate estimation means and (b) the compressor-outflow-air flow rate at the present time point obtained by the present-compressor-outflow-air-flow-rate obtaining means.

8. The air quantity estimation apparatus for an internal combustion engine according to claim 5, wherein the compressor-inflow-air-flow-rate estimation means includes a feedback loop in which a value obtained by subtracting a predetermined feedback quantity from a predetermined input quantity is input to a PID controller, a quantity output from the PID controller is input to the forward model of the air flow model as an input quantity of the forward model, and an output quantity of the forward model is used as the predetermined feedback quantity, wherein the compressor-inflow-air-flow-rate estimation means is configured to obtain the quantity output from the PID controller as the output quantity of the inverse model by giving the electrical physical quantity actually output from the air flowmeter as the predetermined input quantity.

9. The air quantity estimation apparatus for an internal combustion engine according to claim 6, wherein the compressor-inflow-air-flow-rate estimation means includes a feedback loop in which a value obtained by subtracting a predetermined feedback quantity from a predetermined input quantity is input to a PID controller, a quantity output from the PID controller is input to the forward model of the air flow model as an input quantity of the forward model, and an output quantity of the forward model is used as the predetermined feedback quantity, wherein the compressor-inflow-air-flow-rate estimation means is configured to obtain the quantity output from the PID controller as the output quantity of the inverse model by giving the electrical physical quantity actually output from the air flowmeter as the predetermined input quantity.

10. The air quantity estimation apparatus for an internal combustion engine according to claim 7, wherein the compressor-inflow-air-flow-rate estimation means includes a feedback loop in which a value obtained by subtracting a predetermined feedback quantity from a predetermined input quantity is input to a PID controller, a quantity output from the PID controller is input to the forward model of the air flow model as an input quantity of the forward model, and an output quantity of the forward model is used as the predetermined feedback quantity, wherein the compressor-inflow-air-flow-rate estimation means is configured to obtain the quantity output from the PID controller as the output quantity of the inverse model by giving the electrical physical quantity actually output from the air flowmeter as the predetermined input quantity.

11. An air quantity estimation apparatus for an internal combustion engine having an intake passage for introducing outside air into a cylinder, a turbocharger including a compressor disposed in the intake passage and compressing air within the intake passage, and a throttle valve which is disposed in the intake passage to be located downstream of the turbocharger and whose opening can be adjusted to vary a quantity of air flowing through the intake passage, the air quantity estimation apparatus estimating a cylinder-interior air quantity which is a quantity of air having been introduced into the cylinder, and the air quantity estimation apparatus comprising:

a throttle position sensor converting an opening of the throttle valve, the opening being an input quantity, to a first electrical physical quantity being an output quantity, and outputting the first electrical physical quantity;

throttle-valve-opening calculation means for obtaining the first electrical physical quantity actually output from the throttle position sensor every progress of a first predetermined time and calculating, on the basis of the obtained first electrical physical quantity, an actual opening of the throttle valve at a time point when the obtained first electrical physical quantity is output from the throttle position sensor;

an air flowmeter disposed in the intake passage upstream of the compressor and converting a flow rate of air passing through the intake passage, the flow rate being an input quantity, to a second electrical physical quantity being an output quantity, and outputting the second electrical physical quantity;

air-flowmeter-output quantity storage means for obtaining the second electrical physical quantity actually output from the air flowmeter every progress of a second predetermined time and storing the obtained second electrical physical quantity;

compressor-inflow-air-flow-rate estimation means including an inverse model which is a model inverse to a forward model of the air flowmeter, the forward model describing the relation between the input quantity and the output quantity of the air flowmeter, and is configured such that when an output quantity of the forward model is supplied to the inverse model as an input quantity, the inverse model outputs a corresponding input quantity of the forward model as an output quantity, wherein the second electrical physical quantity which was stored by the air-flowmeter-output quantity storage means at a time point in the vicinity of a time point at which the throttle position sensor output the first electrical physical quantity corresponding to the latest actual opening of the throttle valve of all the actual openings of the throttle valve having been calculated before the present time point is applied to the inverse model as the input quantity of the inverse model so as to obtain the output quantity of the inverse model as a compressor-inflow-air flow rate which is a flow rate of air actually flowing into the compressor at the present time point;

cylinder-interior-air-quantity estimation means including an air model which describes, in accordance with physical laws, behavior of air within the intake passage downstream of the compressor by use of at least the opening of the throttle valve and a compressor-outflow-air flow rate which is a flow rate of air flowing out of the compressor into the intake passage, wherein, in order to estimate the cylinder-interior air quantity, the latest actual opening of the throttle valve of all the actual openings of the throttle valve having been calculated before the present time point as the opening of the throttle valve at the present time point is applied to the air model, and the obtained compressor-inflow-air flow rate at the present time point employed as the compressor-outflow-air flow rate at the present time point is applied to the air model.

* * * * *